(12) United States Patent
Jo

(10) Patent No.: US 10,782,876 B2
(45) Date of Patent: Sep. 22, 2020

(54) ELECTRONIC DEVICE FOR PROVIDING CHARACTER INPUT FUNCTION AND METHOD FOR CONTROLLING THEREOF

(71) Applicant: SAMSUNG ELECTRONICS CO., LTD., Suwon-si, Gyeonggi-do (KR)

(72) Inventor: Daeyoung Jo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 250 days.

(21) Appl. No.: 15/360,070

(22) Filed: Nov. 23, 2016

(65) Prior Publication Data

US 2017/0177214 A1    Jun. 22, 2017

(30) Foreign Application Priority Data

Dec. 17, 2015 (KR) ........................ 10-2015-0181199

(51) Int. Cl.
  *G06F 3/0488* (2013.01)
  *H04M 1/725* (2006.01)
  *G06F 3/0484* (2013.01)

(52) U.S. Cl.
  CPC ...... *G06F 3/04886* (2013.01); *G06F 3/04842* (2013.01); *G06F 3/04845* (2013.01); *H04M 1/72569* (2013.01); *G06F 2203/04806* (2013.01)

(58) Field of Classification Search
  CPC ............. G06F 3/04886; G06F 3/04842; G06F 3/04845; G06F 2203/04806; H04M 1/72569
  See application file for complete search history.

(56) References Cited

U.S. PATENT DOCUMENTS

| 8,405,677 | B2 | 3/2013 | Ranford |
| 2008/0284744 | A1 | 11/2008 | Park et al. |
| 2010/0110012 | A1 | 5/2010 | Maw |
| 2010/0177121 | A1 | 7/2010 | Homma et al. |

(Continued)

FOREIGN PATENT DOCUMENTS

| KR | 10-2011-0076771 | 7/2011 |
| KR | 10-1118609 | 2/2012 |

(Continued)

OTHER PUBLICATIONS

Search Report and Written Opinion dated Mar. 13, 2017 in counterpart International Patent Application No. PCT/KR2016/013886.

(Continued)

*Primary Examiner* — Beau D Spratt
(74) *Attorney, Agent, or Firm* — Nixon & Vanderhye P.C.

(57) ABSTRACT

The disclosure relates generally to an electronic device for providing a character input function and a method for controlling thereof. The electronic device includes: a display; and a processor configured to output a character input screen through the display, to change a configuration of the character input screen by magnifying at least part of a first area of the character input screen and reducing at least part of a second area of the character input screen based on a first input on the character input screen, and to select a character based on a second input on the changed character input screen. Various example embodiments are possible.

20 Claims, 22 Drawing Sheets

(56) References Cited

U.S. PATENT DOCUMENTS

| | | | | |
|---|---|---|---|---|
| 2010/0265181 A1* | 10/2010 | Shore | ............... | G06F 3/0237 345/168 |
| 2011/0078567 A1* | 3/2011 | Kim | ............... | G06F 3/0236 715/702 |
| 2012/0113007 A1* | 5/2012 | Koch | ............... | G06F 3/0488 345/168 |
| 2012/0206363 A1* | 8/2012 | Kyprianou | ............... | G06F 3/04883 345/168 |
| 2013/0057475 A1 | 3/2013 | Duggan et al. | | |
| 2013/0179845 A1* | 7/2013 | Bok | ............... | G06F 3/04886 715/863 |
| 2014/0098024 A1* | 4/2014 | Paek | ............... | G06F 3/04886 345/168 |
| 2014/0247218 A1* | 9/2014 | Walton | ............... | G06F 3/04886 345/168 |
| 2015/0160842 A1* | 6/2015 | Yabuki | ............... | G06F 3/04845 715/773 |
| 2016/0139803 A1* | 5/2016 | Yan | ............... | G06F 3/0216 715/773 |
| 2017/0052702 A1* | 2/2017 | Norris, III | ............... | G06F 3/04886 |

FOREIGN PATENT DOCUMENTS

| | | |
|---|---|---|
| KR | 10-2012-0030840 | 3/2012 |
| KR | 10-2014-0061042 | 5/2014 |
| KR | 10-2015-0090766 | 8/2015 |

OTHER PUBLICATIONS

EP Extended Search Report for EP Application No. 16875950.4 dated Nov. 20, 2018.

European Office Action dated Sep. 11, 2019 for EP Application No. 16875950.4.

* cited by examiner

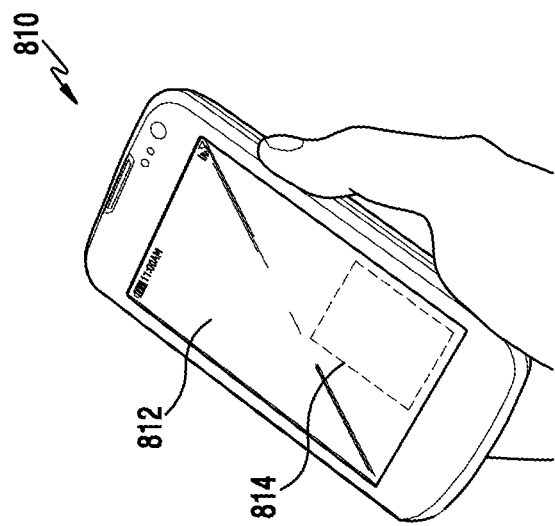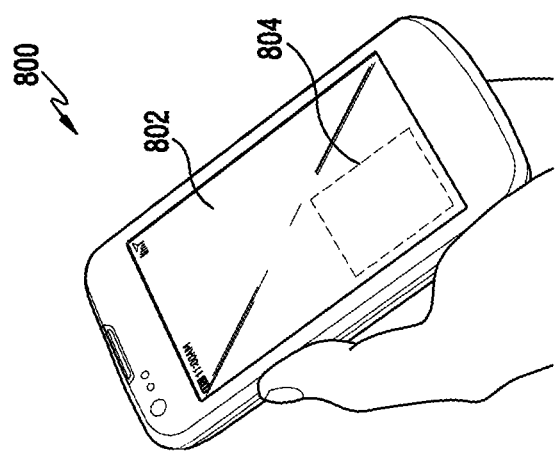
FIG. 8

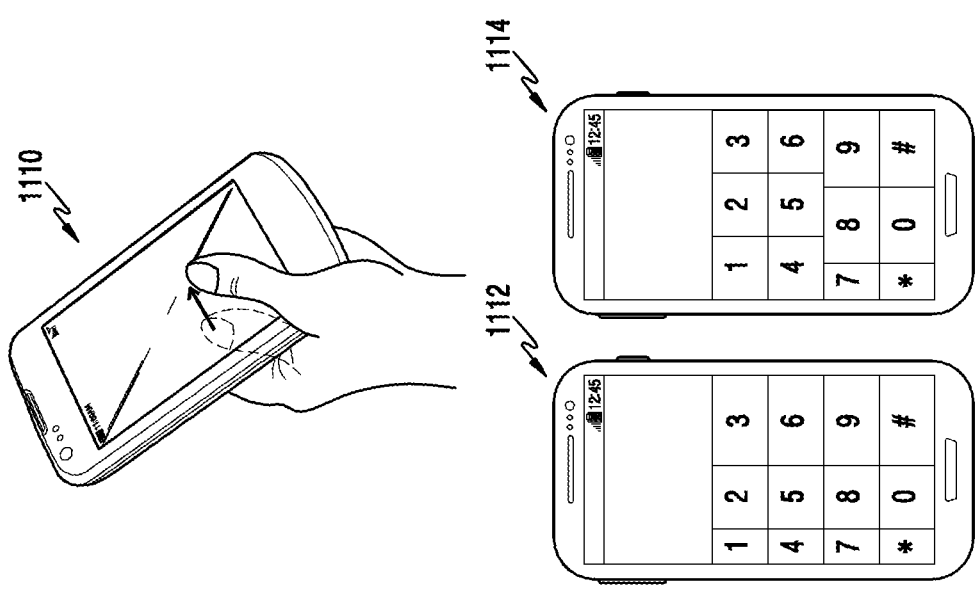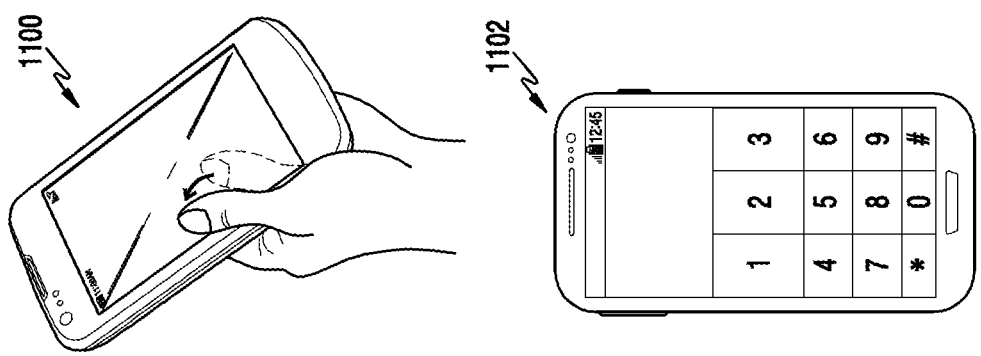
FIG.11

ELECTRONIC DEVICE FOR PROVIDING CHARACTER INPUT FUNCTION AND METHOD FOR CONTROLLING THEREOF

CROSS-REFERENCE TO RELATED APPLICATION

The present application is based on and claims priority under 35 U.S.C. § 119 to an application filed in the Korean Intellectual Property Office on Dec. 17, 2015 and assigned Serial No. 10-2015-0181199, the disclosure of which is incorporated by reference herein in its entirety.

BACKGROUND

1. Technical Field

Various example embodiments of the present disclosure relate generally to an electronic device for providing a character input function and a method for controlling thereof 2. Description of Related Art In recent years, electronic devices which can perform one or more complex functions are increasingly used. Furthermore, mobile terminals which are known as "smartphones" are representative examples of such electronic devices. A mobile terminal may include a display module with a large touch screen and a high pixel camera in addition to basic functions such as communicating with others. Therefore, the mobile terminal can capture a still image or a moving image. In addition, the mobile terminal is able to reproduce multimedia contents such as music, moving images, or the like, and is able to perform web surfing by accessing a network. Such a mobile terminal is able to perform various functions with the inclusion of a high performance processor.

A recent electronic device is able to generate or store various kinds of data. For example, the electronic device may generate data which is formed of at least one character.

As described above, the electronic device may output a virtual keypad for allowing a user to input a character thereto.

However, due to the characteristic of the electronic device having a screen of a small size, the electronic device may output a virtual keypad with a limited key input area, and accordingly, there may occur an unintended key input.

SUMMARY

An aspect of the present disclosure is to address at least the above-mentioned problems and/or disadvantages and to provide the features described below. Accordingly, an example aspect of the present disclosure provides an electronic device which magnifies at least part of a character input screen and reduces at least part of the character input screen, and a method for controlling thereof.

According to an example aspect of the present disclosure, an electronic device includes: a display; and a processor configured to output a character input screen through the display, to change a configuration of the character input screen by magnifying at least part of a first area of the character input screen and to reduce at least part of a second area of the character input screen based on a first input on the character input screen, and to select a character based on a second input on the character input screen having the changed configuration.

According to another example aspect of the present disclosure, a method for operating of an electronic device includes: outputting a character input screen through a display; changing a configuration of the character input screen by magnifying at least part of a first area of the character input screen and reducing at least part of a second area of the character input screen based on a first input on the character input screen; and selecting a character based on a second input on the character input screen having the changed configuration.

According to another example aspect of the present disclosure, a non-transitory computer readable recording medium has recorded thereon a program which, when executed by a processor, causes an electronic apparatus to perform operations comprising: outputting a character input screen through a display; changing a configuration of the character input screen by magnifying at least part of a first area of the character input screen and reducing at least part of a second area of the character input screen based on a first input on the character input screen; and selecting a character based on a second input on the character input screen having the changed configuration.

According to another example aspect of the present disclosure, an electronic device includes: a housing; a touch screen display which is exposed through one surface of the housing; a processor which is included in the housing and is electrically connected to the display; and a memory which is electrically connected with the processor. According to an example embodiment, the memory stores instructions which, when executed by the processor cause the processor to perform operations comprising: displaying a user interface which displays a keypad including a plurality of keys on the display; using the display to monitor whether a part of a user's body or a part of an article is within a predetermined distance from the surface of the display without being in contact with the surface of the display; when the part of the user's body or the part of the article is not within the predetermined distance from the surface of the display, displaying the plurality of keys of the keypad at a substantially same first size; and, when the part of the user's body or the part of the article is within the predetermined distance from the surface of the display, displaying a first key which is adjacent to the part of the user's body or the part of the article from among the plurality of keys of the keypad at a second size which is larger than the first size.

BRIEF DESCRIPTION OF THE DRAWINGS

These and other aspects, features and attendant advantages will become more readily apparent from the following detailed description, taken in conjunction with the accompanying drawings, in which like reference numerals refer to like elements, and wherein:

FIG. 8 is a diagram illustrating an example operation of setting a first determination area in the electronic device according to various example embodiments;

FIG. 11 is a diagram illustrating an example operation of determining a magnification area in response to an input in the electronic device according to various example embodiments;

DETAILED DESCRIPTION

Figure 1:
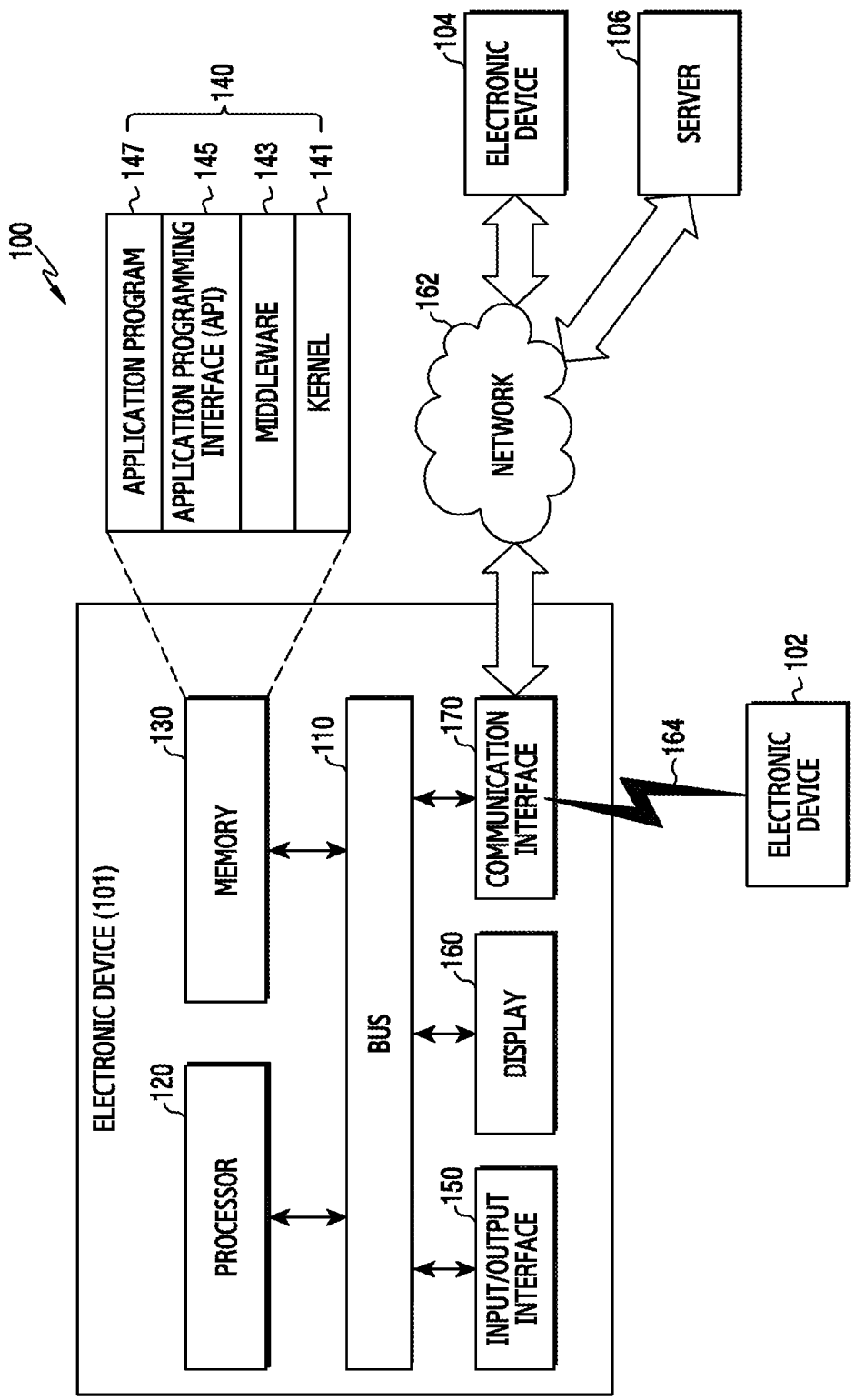
FIG. 1 is a diagram illustrating an example electronic device in an example network environment according to various example embodiments.

Hereinafter, various example embodiments of the present disclosure will be described with reference to the accompanying drawings. In the following description, various details such as example configuration and components are merely provided to assist the overall understanding of these example embodiments of the present disclosure. Therefore, it should be apparent to those skilled in the art that various changes and modifications of the example embodiments described herein can be made without departing from the scope and spirit of the present disclosure. In addition, descriptions of well-known functions and constructions may be omitted for clarity and conciseness.

The present disclosure may describe various example embodiments, and modifications and changes may be made therein. Therefore, the present disclosure will be described in greater detail with reference to various example embodiments illustrated in the accompanying drawings. However, it should be understood that the present disclosure is not limited to the disclosed embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the description of the present disclosure indicate the presence of disclosed corresponding functions, operations, elements, and the like, and do not limit additional one or more functions, operations, elements, and the like. In addition, it should be understood that the terms "include" or "have" used in the description of the present disclosure are used to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although terms such as "first" and "second" used in the description of the present disclosure may modify various elements of various example embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. On the other hand, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" is not necessarily limited to "specifically designed to" in a hardware level. Instead, the expression "apparatus configured to . . . " may refer to the situation in which the apparatus is "capable of . . . " along with other devices or parts in a certain situation. For example, "a processor configured to (set to) perform A, B, and C" may be a dedicated processor, e.g., processing circuitry, an embedded processor, etc., for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain example embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in the description of the various example embodiments of the present disclosure.

An electronic device according to various example embodiments of the present disclosure may be a device. For example, the electronic device according to various example embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch), or the like, but is not limited thereto.

In other example embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync™, Apple TV™, or Google TV™); a game console (e.g., Xbox™, PlayStation™); an electronic dictionary; an electronic key; a camcorder; or an electronic frame, or the like, but is not limited thereto.

In other example embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like), or the like, but is not limited thereto.

In certain example embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), or the like, but is not limited thereto.

An electronic device according to various example embodiments of the present disclosure may also include a combination of one or more of the above-mentioned devices. Further, it will be apparent to those skilled in the art that an electronic device according to various example embodiments of the present disclosure is not limited to the above-mentioned devices.

FIG. 1 is a diagram illustrating an example network environment 100 including an electronic device 101 according to various example embodiments. Referring to FIG. 1, the electronic device 101 may include a bus 110, a processor 120, a memory 130, an input/output (I/O) interface (e.g., including input/output circuitry) 150, a display 160, and a communication interface (e.g., including communication circuitry) 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 may include various processing circuitry, such as, for example, and without limitation, a central processing unit (CPU), a communication processor (CP), a graphic processing unit (GPU), or the like.

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include any suitable type of volatile or non-volatile memory. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may include various input/output circuitry configured to transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may include various communication circuitry configured to perform communication between the electronic device 101 and an external device (for example, the electronic device 104 or the server 106) to provide a suitable connection. For example, the communication interface 170 may be connected to a network 162 through wireless communication or wired communication, and may communicate with an external device 102 via a connection 164.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM) as a cellular communication protocol.

The wired communication may include, for example, at least one of universal serial bus (USB), high definition multimedia interface (HDMI), recommended standard 232 (RS-232), and plain old telephone service (POTS). The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an example embodiment, the server 106 may include a group of one or more servers. According to various example embodiments, all or some of the operations executed in the electronic device 101 may be carried out in another electronic device or a plurality of electronic devices (for example, the electronic device 102 or 104 and the server 106). According to an example embodiment, when the electronic device 101 may perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
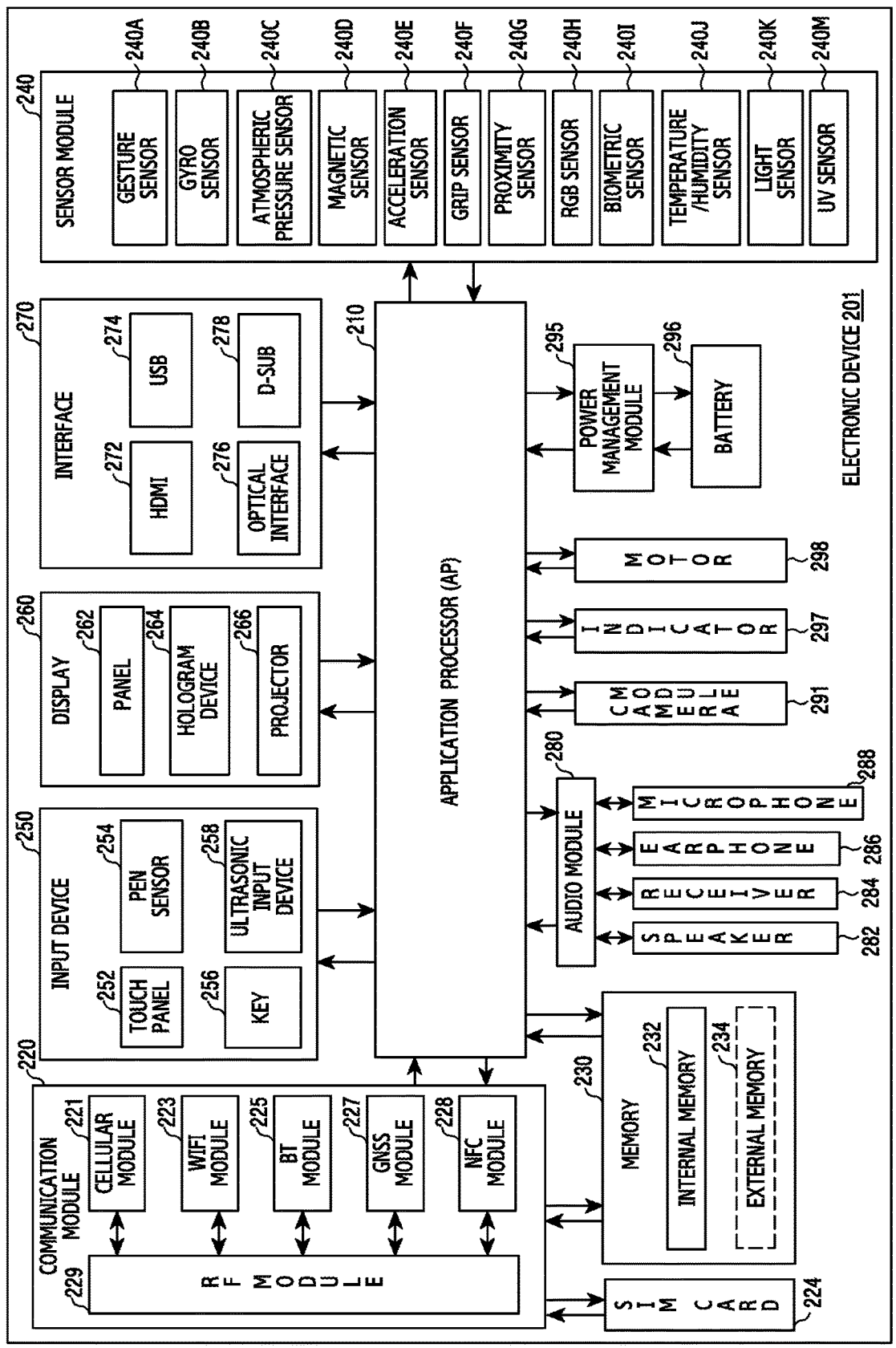
FIG. 2 is a block diagram illustrating an example electronic device according to various example embodiments.

FIG. 2 is a block diagram 200 illustrating an example electronic device 201 according to various example embodiments of the present disclosure. The electronic device 201 may include, for example, all or a portion of the electronic device 21 illustrated in FIG. 1. Referring to FIG. 2, the electronic device 201 may include one or more application processors (AP) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as processing circuitry and may be included in, for example, a system on chip (SoC). According to an example embodiment, the AP 210 may further include at least one of a graphic processing unit (GPU) or image signal processor. According to an example embodiment, the AP 210 may be implemented to include at least a portion (e.g., the cellular module 221) of the above-described elements. Also, the AP 210 may store data received from at least one of other elements or generated by at least one of other elements in a non-volatile memory.

The communication module 220 (e.g., the communication interface 160) may include various communication circuitry configured to perform data transmission/reception in communication between the electronic device 201 (e.g., the electronic device 21) and other electronic devices (e.g., the electronic device 24 or the server 26) connected via a network. According to an example embodiment, the communication module 220 may include various communication circuitry, such as, for example, and without limitation, at least one of a cellular module 221, a Wi-Fi module 223, a BT module 225, a GPS (GNSS) module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an example embodiment, the cellular module 221 may perform at least a portion of functions that may be provided by the AP 210. According to an example embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identity module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an example embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., RGB (red, green, blue) sensor), a living body (e.g., biometric) sensor 240I, a temperature/humidity sensor 240J, an illuminance (e.g., light) sensor 240K, and/or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include various input circuitry, such as, for example, and without limitation, at least one of a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, at least one of a high-definition multimedia interface (HDMI) 272, a universal serial bus (USB) 274, an optical interface 276, or a D-subminiature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various example embodiments of the present disclosure may be implemented by one or more components, and the name of the corresponding element may vary with a type of electronic device. The electronic device according to various example embodiments of the present disclosure may include at least one of the aforementioned elements. Some elements may be omitted or other additional elements may be further included in the electronic device. Further, some of the components of the electronic device according to the various example embodiments of the present disclosure may be combined to form a single entity, and thus, may equivalently execute functions of the corresponding elements prior to the combination.

Figure 3:
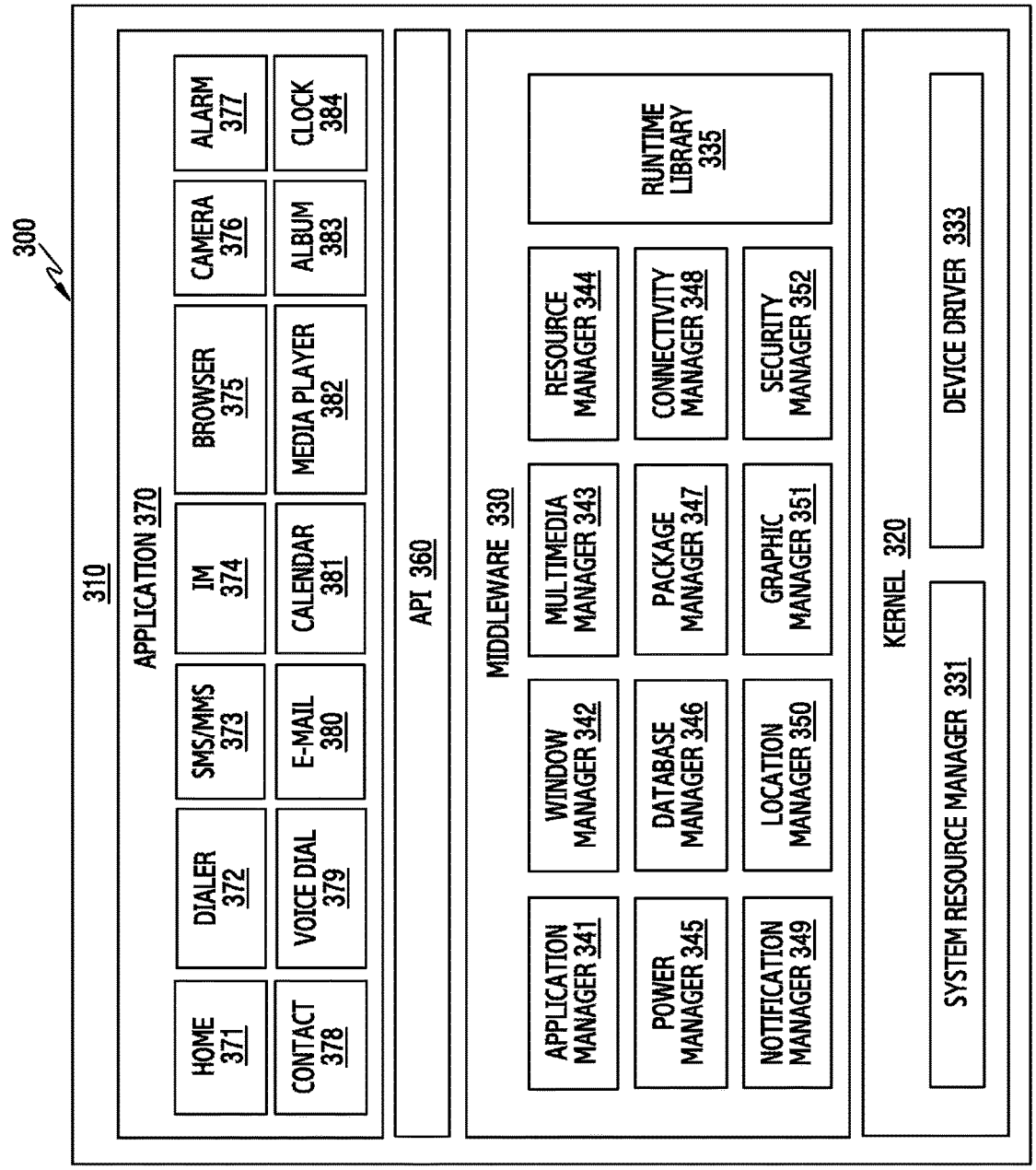
FIG. 3 is a block diagram illustrating an example program module according to various example embodiments.

FIG. 3 is a block diagram 300 illustrating an example program module 310 according to various example embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android™, iOS™, Windows™, Symbian™, Tizen™, Bada™, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an example embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an example embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android™ or iOS™ may provide one API set per platform, and Tizen™ may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an example embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an example embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a pre-loaded application or a third party application which can be downloaded from the server. The names of the components of the program module 310 according to the embodiment illustrated in FIG. 3 may vary according to the type of operating system.

According to various example embodiments, at least some of the programming module 310 may be implemented by software, firmware, hardware (e.g., circuitry), or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

Figure 4:
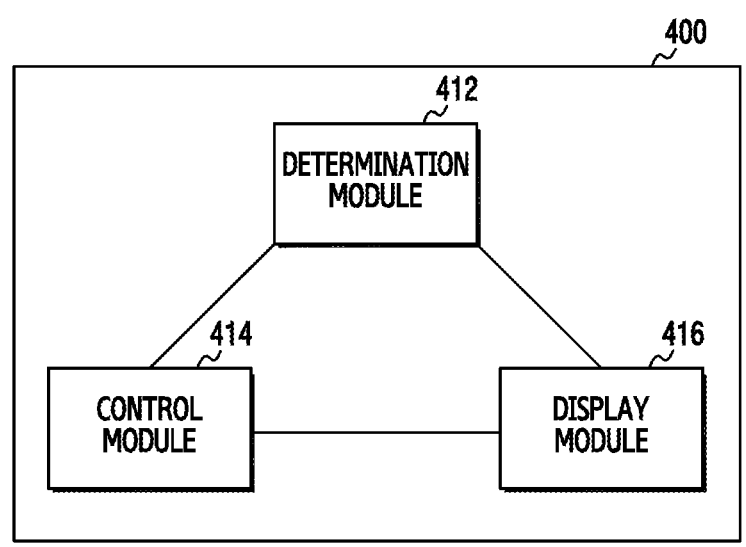
FIG. 4 is a block diagram illustrating an example electronic device according to various example embodiments of the present disclosure.

FIG. 4 is a block diagram illustrating an example electronic device 400 according to various example embodiments of the present disclosure. According to an example embodiment, the electronic device 400 may be a part of the electronic device 101 or the electronic device 201 (for example, the processor 120, the application processor 210, or the like).

According to various example embodiments, the electronic device 400 may include a determination module (e.g., including determination circuitry) 412, a control module (e.g., including processing circuitry) 414, and a display module (e.g., including display circuitry, a display panel, etc.) 416.

According to various example embodiments of the present disclosure, the determination module 412 may include various circuitry, software and/or firmware configured to detect an input for controlling the electronic device 400. According to various example embodiments, the determination module 412 may determine whether a condition for changing a screen configuration is satisfied or not based on an input. For example, the determination module 412 may determine whether an input designated to change a configuration of a character input screen (for example, a virtual keypad or the like) is detected or not. According to an example embodiment, the designated condition may be related to a movement of an input. For example, the determination module 412 may determine that an input satisfying the condition is detected in response to it being determined that the detected input leaves from a pre-designated area or enters a pre-designated area. According to another example embodiment, the designated condition may be related to an input holding time. For example, the determination module 412 may determine that an input satisfying the condition is detected in response to it being determined that the input is held in a pre-designated area for longer than a pre-designated time. According to various example embodiments, the designated condition may be related to at least one of an input area and a pressure. For example, the determination module 412 may determine that an input satisfying the condition is detected in response to an input corresponding to a pre-designated area or pressure being detected. According to various example embodiments, the determination module 412 may perform a determining operation with respect to a contactless input (for example, a hovering input or the like). The determination module 412 may perform a determining operation with respect to a contact input (for example, a touch input or the like). According to various example embodiments, the determination module 412 may determine whether a condition for restoring a changed screen configuration is satisfied or not based on an input. For example, the determination module 412 may determine an input for restoring a screen configuration based on at least one of a movement of an input, an input holding time, an input area, and an input pressure.

According to various example embodiments of the present disclosure, the control module 414 may include processing or control circuitry configured to control at least part of the electronic device 400 in response to an input. According to various example embodiments, the control module 414 may control the display module 416 (for example, the display) to output a screen to be related to the operation of the electronic device 400. According to various example embodiments, the control module 414 may be configured to change the configuration of an outputted screen based on a result of the determining by the determination module 412. According to an example embodiment, the control module 414 may be configured to magnify at least part of an area that the user intends to input to. For example, the control module 414 may detect a movement of an input and process to magnify an area corresponding to a moving direction. According to another example embodiment, the control module 414 may be configured to reduce at least part of the area through which an input passes. For example, in response to an input which moves from bottom to top on the screen, the control module 414 may magnify at least part of a first area of the screen and reduce at least part of a second area of the screen. The first area of the screen may correspond to the moving direction of the input, and the second area of the screen may be opposite to the first area. For example, the first area may include an area that the user intends to touch. Furthermore, the control module 414 may increase a magnification in response to a moving distance. According to various example embodiments, the control module 414 may restore a changed screen configuration based on a result of the determining by the determination module 412.

According to various example embodiments, the control module 414 may magnify only a part of the area satisfying the condition for changing the configuration of an outputted screen. For example, a part of the area satisfying the condition may be an area from which an input is detected more than a pre-designated number of times (for example, a key input area). In another example, a part of the area satisfying the condition may be an area which is pre-defined by the user (for example, a key input area).

According to various example embodiments of the present disclosure, the display module 416 may include a display which displays a screen which is processed by the control module 414. According to an example embodiment, the display module 416 may output a screen in which at least part of the screen is magnified and at least part of the other areas which are not magnified is reduced in response to an input.

According to various example embodiments, an electronic device may include a display and a processor (e.g., including processing circuitry). According to an example embodiment, the processor may be configured to output a character input screen through the display, to change a configuration of the character input screen by magnifying at least part of a first area of the character input screen and reducing at least part of a second area of the character input screen based on a first input on the character input screen, and to select a character based on a second input on the changed character input screen.

According to various example embodiments, the processor may be configured to determine a magnification area of the character input screen and a magnification on the magnification area based on a moving direction and a moving distance of the first input on the character input screen.

According to various example embodiments, the processor may be configured to detect a movement of the first input leaving from a first pre-designated area and to change the configuration of the character input screen.

According to various example embodiments, the processor may be configured to set the first pre-designated area based on a grip state.

According to various example embodiments, the processor may be configured to display the magnified area on at least part of a second pre-designated area.

According to various example embodiments, the processor may be configured to set an area that a user is able to provide an input to in a grip state as the second area.

According to various example embodiments, the processor may be configured to restore the changed character input screen based on the first input on the changed character input screen.

According to various example embodiments, the processor may be configured to detect a movement of the first input entering a third pre-designated area and to restore the configuration of the character input screen.

According to various example embodiments, the processor may be configured to set the third area within the first pre-designated area.

According to various example embodiments, an electronic device may include a housing, a touch screen display which is exposed through one surface of the housing; a processor which is included in the housing and is electrically connected with the display; and a memory which is electrically connected with the processor.

According to various example embodiments, the memory may store instructions for the processor which, when executed, cause the processor to perform operations including: displaying a user interface which displays a keypad including a plurality of keys on the display; monitoring, using the display, whether a part of a user's body or a part of an article is within a predetermined distance from the surface of the display without being in contact with the surface of the display; when the part of the user's body or the part of the article is not within the predetermined distance from the surface of the display, displaying the plurality of keys of the keypad at a substantially same first size; and, when the part of the user's body or the part of the article is within the predetermined distance from the surface of the display, displaying a first key which is adjacent to the part of the user's body or the part of the article from among the plurality of keys of the keypad at a second size which is larger than the first size.

According to various example embodiments, the instructions may be instructions which, when executed, cause the processor to, as a result of the monitoring, when the part of the user's body or the part of the article is within the predetermined distance from the surface of the display, display at least one of second keys directly adjacent to the first key at the second size.

According to various example embodiments, the keypad may have the keys arranged in a matrix form including a plurality of columns and a plurality of rows, and at least one of the second keys directly adjacent to the first key may be included in the same column or the same row as the first key.

According to various example embodiments, the keypad may have the keys arranged in a matrix form including a plurality of columns and a plurality of rows, and at least one of the second keys directly adjacent to the first key may be included in a second column directly adjacent to a first column including the first key and/or in a second row directly adjacent to a first row including the first key.

According to various example embodiments, the instructions may be instructions which, when executed, cause the processor to, as a result of the monitoring, when the part of the user's body or the part of the article is within the predetermined distance from the surface of the display, display at least one of the keys except for the first key at a third size which is smaller than the first size.

According to various example embodiments, the keypad may include number keys and special character keys which are arranged in a matrix form including three columns and four rows.

According to various example embodiments, the keypad may include a QWERTY keypad.

According to various example embodiments, the memory may store at least one application program of a telephone application, a message application, an email application, a web browser application, or a word processing application.

According to various example embodiments, the user interface may be a part of the at least one application program or may be configured to be executed with the at least one application program when the at least one application program is executed.

Figure 5:
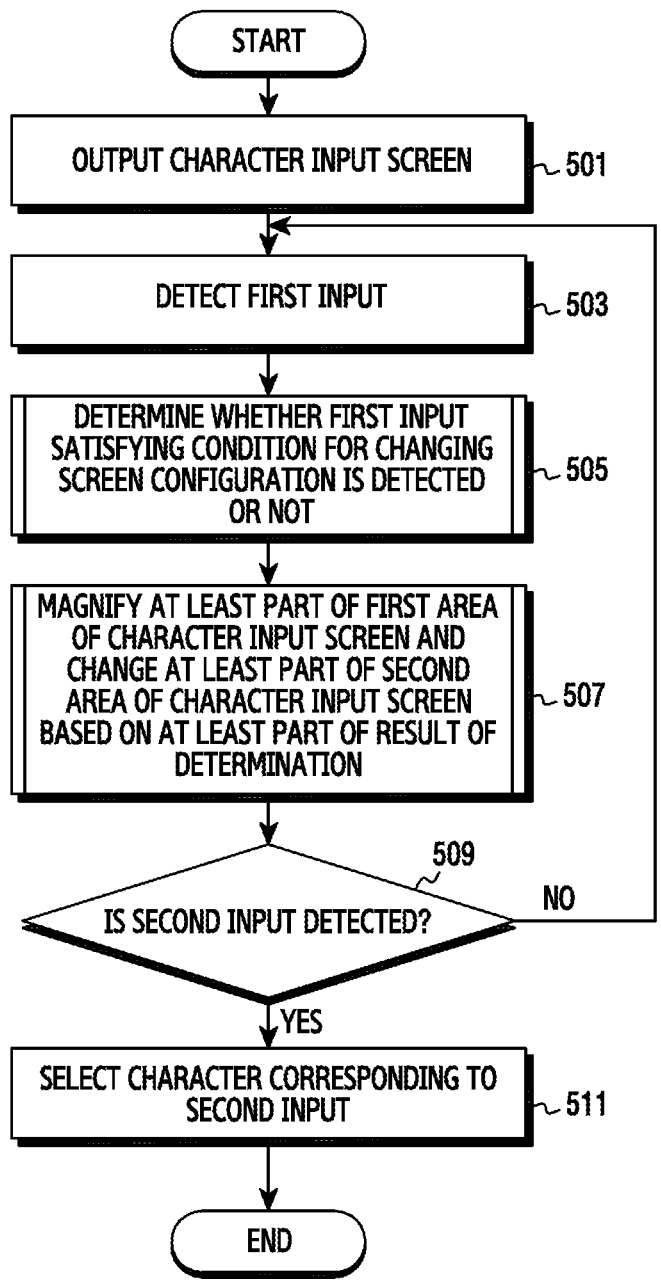
FIG. 5 is a flowchart illustrating an example operation of performing a character input function in the electronic device according to various example embodiments of the present disclosure.
Figure 6:
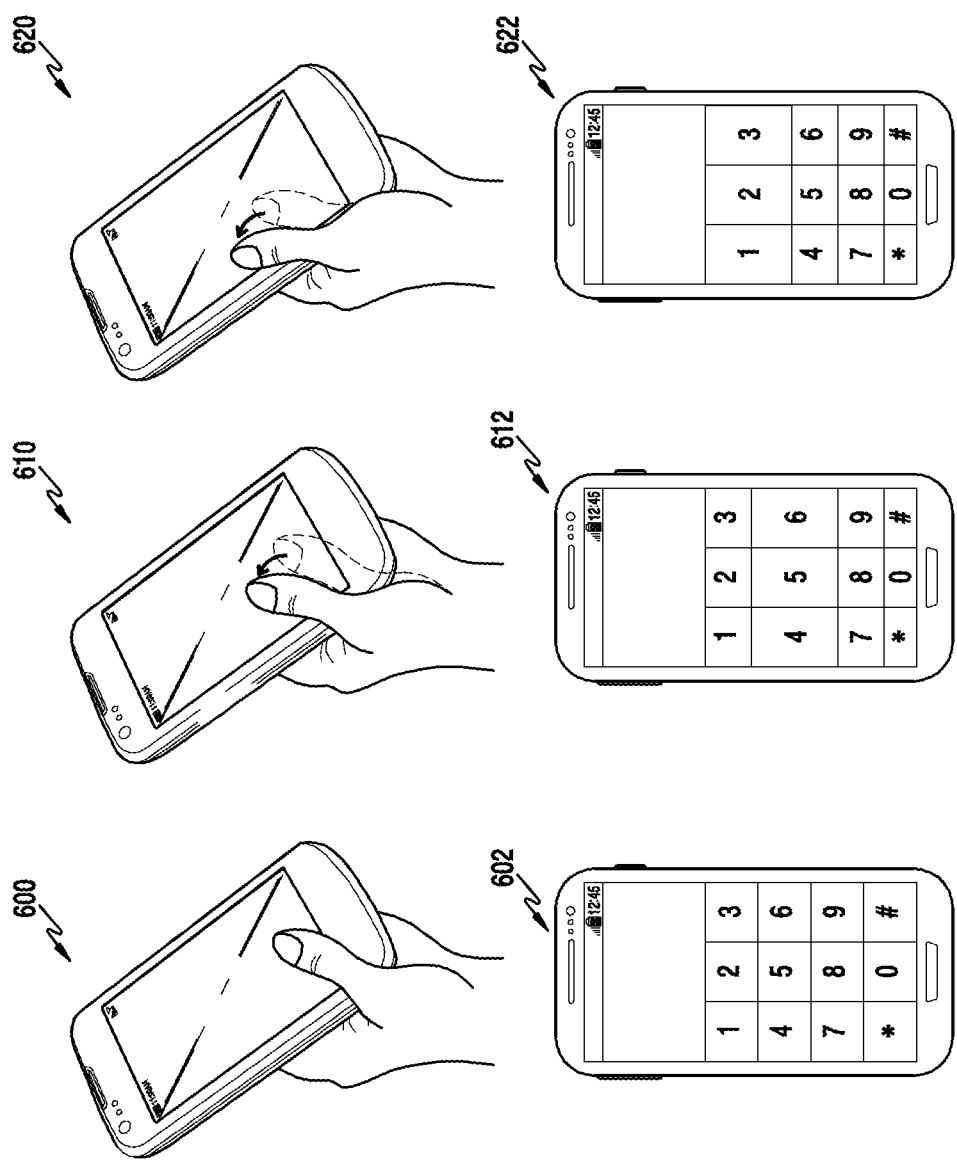
FIG. 6 is a diagram illustrating an example operation of changing a configuration of a character input screen in the electronic device according to various example embodiments.

FIG. 5 is a flowchart illustrating an example operation of performing a character input function of the electronic device 400 according to various example embodiments of the present disclosure. According to an example embodiment, the electronic device 400 may be the electronic device 101 or the electronic device 201 or a part thereof (for example, the processor 120 or the application 210). Furthermore, FIG. 6 is a diagram illustrating an example operation of changing a configuration of a character input screen in the electronic device 400 according to various example embodiments.

According to various example embodiments, as in operation 501, the electronic device 400 may output a character input screen. According to various example embodiments, the character may include, for example, and without limitation, at least one of an alphabet, a number, a sign, a special character, and a Korean alphabet. For example, the character input screen may be related to at least one of a character message function, a calculation function, a dial function, a memo function, an electronic mail function, and a document creation function, or the like, but is not limited thereto.

According to various example embodiments of the present disclosure, as in operation 503, the electronic device 400 may detect a first input. According to an example embodiment, the first input may be distinguished from an input for selecting a character. According to various example embodiments, the electronic device 400 may detect a first input of a contactless type (for example, a hovering input or the like) over the character input screen. This is merely an example embodiment of the present disclosure, and the electronic device 400 may detect a first input of a contact type (for example, a touch input or the like). Furthermore, the electronic device 400 may detect a first input of a voice type, a gesture type, movement, or the like, but is not limited thereto.

According to various example embodiments of the present disclosure, as in operation 505, the electronic device 400 may determine whether the first input satisfying a condition is detected or not. According to various example embodiments, the condition may be a condition which is designated to change a screen configuration. According to an example embodiment, the condition may be related to a movement of an input. For example, the electronic device 400 may determine that the first input satisfying the condition is detected in response to it being determined that the detected first input leaves from a pre-designated area or enters a pre-designated area. According to another example embodiment, the designated condition may be related to an input holding time. For example, the electronic device 400 may determine that the first input satisfying the condition is detected in response to it being determined that the input is held in a pre-designated area for longer than a pre-designated time. According to various example embodiments, the condition may be related to at least one of an input area and a pressure. For example, the electronic device 400 may determine that the first input satisfying the condition is detected in response to an input corresponding to a pre-designated area or pressure being detected.

According to various example embodiments of the present disclosure, as in operation 507, the electronic device 400 may change the configuration of the character input screen based on at least part of the result of the determining the first input. According to an example embodiment, the electronic device 400 may magnify at least part of a first area of the character input screen. Furthermore, the electronic device 400 may reduce at least part of a second area of the character input screen in response to the at least part of the area being magnified. According to an example embodiment, the first area of the character input screen may correspond to a moving direction of the first input, and the second area of the character input screen may be opposite to the first area. For example, the first area may include an area that the user intends to touch. According to an example embodiment, as illustrated in FIG. 6, when the first input satisfies a first condition (for example, moves by longer than a first designated distance) (600), the electronic device 400 may output a normal character input screen 602. According to another example embodiment, when the first input satisfies a second condition (for example, moves by longer than a second designated distance) (610), the electronic device 400 may output a character input screen 612 of which at least part, for example, the middle area of the screen, is magnified. According to another example embodiment, when the first input satisfies a third condition (for example, moves by longer than a third designated distance) (620), the electronic device 400 may output a character input screen 622 of which at least part, for example, the upper end area of the screen, is magnified.

According to various example embodiments of the present disclosure, as in operation 509, the electronic device 400 may detect a second input. According to an example embodiment, the second input may, for example, be an input for selecting a character. For example, the electronic device 400 may detect a second input of a contact type (for example, a touch input or the like) on the character input screen. This is merely an example embodiment of the present disclosure, and the electronic device 400 may detect a second input of a contactless type (for example, a hovering input or the like) or a second input of a voice type, a gesture type, or the like.

According to various example embodiments of the present disclosure, when the second input is not detected in operation 509, the electronic device 400 may perform the operation of changing the screen configuration based on the first input. According to an example embodiment, the electronic device 400 may perform operations related to operations 503 to 507.

According to various example embodiments of the present disclosure, when the second input is detected in operation 509, the electronic device 400 may select a character corresponding to the second input in operation 511.

Figure 7:
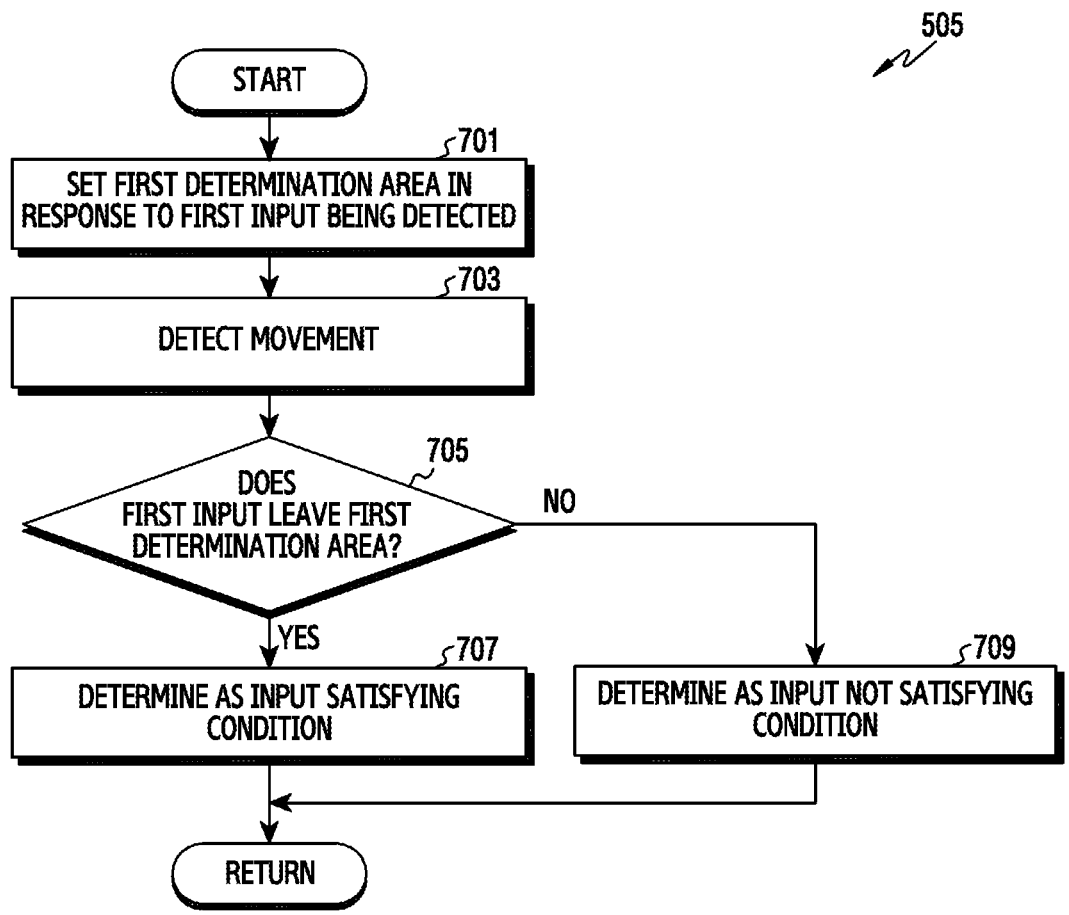
FIG. 7 is a flowchart illustrating an example operation of performing an operation of detecting an input satisfying a condition in the electronic device according to various example embodiments of the present disclosure.

FIG. 7 is a flowchart illustrating an example operation of performing an operation of detecting an input satisfying a condition in the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of detecting the input satisfying the condition may be a detailed operation of operation 505 of FIG. 5. Furthermore, FIG. 8 is a diagram illustrating an example operation of setting a first determination area in the electronic device 400 according to various example embodiments.

According to various example embodiments of the present disclosure, as in operation 701, the electronic device 400 may set a first determination area in response to a first input being detected. According to various example embodiments, the first determination area may be an area which is used to determine whether to change a screen configuration. According to an example embodiment, the electronic device 400 may set the first determination area based on, for example, a user's grip state. For example, in a left hand grip state 800, the electronic device 400 may set at least part of the left lower end of a character input screen 802 as the first determination area (804). In another example, in a right hand grip state 810, the electronic device 400 may set at least part of the right lower end of a character input screen 812 as the first determination area (814). According to an example embodiment, the electronic device 400 may determine the grip state based on at least one sensor (for example, a grip sensor or the like). According to another example embodiment, the electronic device 400 may set at least part of the periphery of an input detection area as the first determination area. For example, when the first input is detected over the middle of the character input screen, the electronic device 400 may set a pre-designated area with reference to the point over which the first input is detected as the first determination area.

According to various example embodiments of the present disclosure, as in operation 703, the electronic device 400 may detect a movement of the first input. According to an example embodiment, the movement may be changing an input location while holding the first input. For example, the movement may be a movement of the first input in at least one direction of an upward direction, a downward direction, a leftward direction, and a rightward direction.

According to various example embodiments of the present disclosure, as in operation 705, the electronic device 400 may determine whether the first input leaves the first determination area or not.

According to various example embodiments of the present disclosure, when the first input leaving the first determination area is detected in operation 705, the electronic device 400 may determine that the first input is an input satisfying the condition as in operation 707.

According to various example embodiments of the present disclosure, when the first input leaving the first determination area is not detected in operation 705, in other words, when the first input moves within the first determination area, the electronic device 400 may determine that the first input is an input not satisfying the condition as in operation 709. According to various example embodiments, when a second input, for example, an input of selecting a character, is detected in the first determination area, the electronic device 400 may select a character corresponding to the second input.

According to various example embodiments, after determining the input satisfying the condition or the input not satisfying the condition, the electronic device 400 may perform an operation of changing the configuration of the character input screen. For example, the electronic device 400 may perform operations related to operations 507 to 511.

Figure 9:
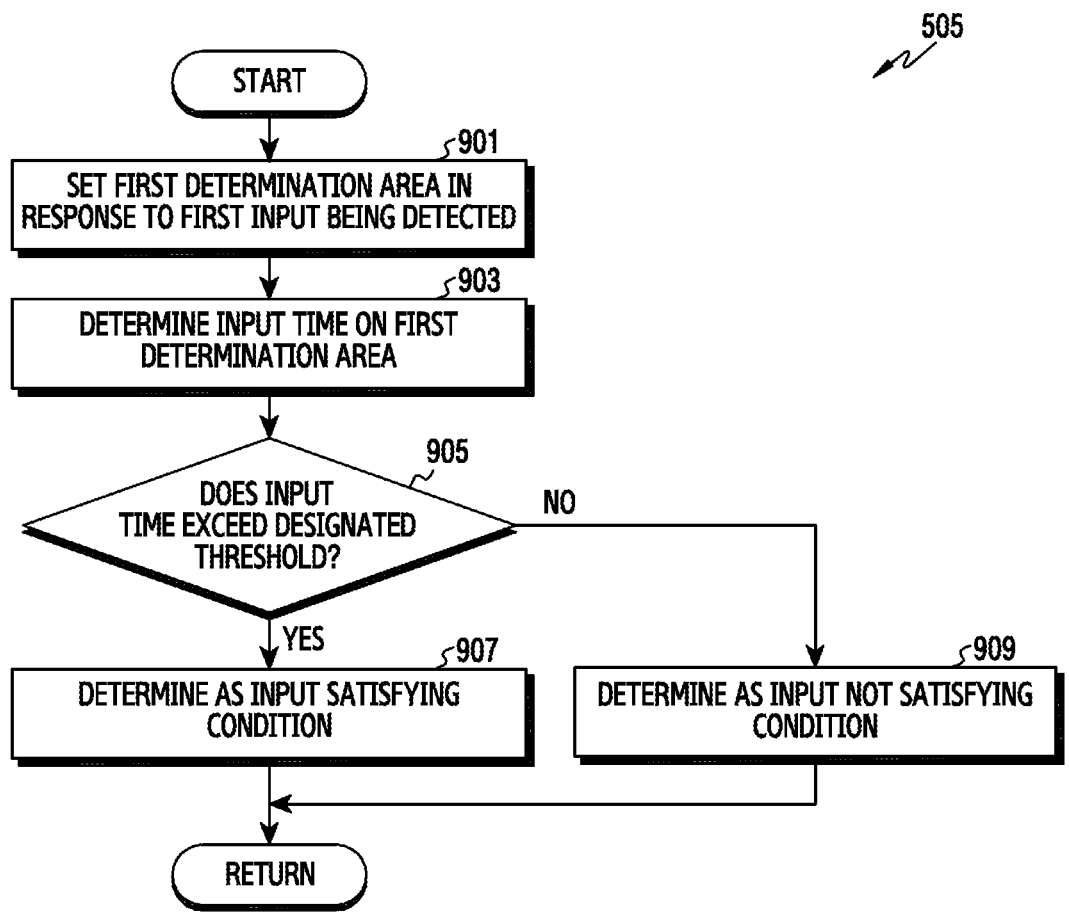
FIG. 9 is a flowchart illustrating an example operation of performing an operation of detecting an input satisfying a condition in the electronic device according to various example embodiments of the present disclosure.

FIG. 9 is a flowchart illustrating an example operation of performing an operation of detecting an input satisfying a condition in the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of detecting the input satisfying the condition may be a detailed operation of operation 505 of FIG. 5. Furthermore, a similar or same description to or as in FIG. 7 is omitted from the descriptions of FIG. 9 for ease of explanation.

According to various example embodiments of the present disclosure, as in operation 901, the electronic device 400 may set a first determination area in response to a first input. According to various example embodiments, the first determination area may be an area which is used to determine whether to change a screen configuration or not.

According to various example embodiments of the present disclosure, as in operation 903, the electronic device 400 may determine an input time on the first determination area. According to an example embodiment, the electronic device 400 may determine the time of the first input which is held without moving within the first determination area.

According to various example embodiments of the present disclosure, as in operation 905, the electronic device 400 may determine whether the input time exceeds a designated (e.g., predetermined) threshold or not.

According to various example embodiments of the present disclosure, when the first input is held for longer than the threshold in operation 905, the electronic device 400 may determine that the first input is an input satisfying the condition as in operation 907.

According to various example embodiments of the present disclosure, when the first input is not held for longer than the threshold in operation 905, the electronic device 400 may determine that the first input is an input not satisfying the condition as in operation 909.

According to various example embodiments, after determining the input satisfying the condition or the input not satisfying the condition, the electronic device 400 may perform an operation of changing the configuration of the character input screen. For example, the electronic device 400 may perform operations related to operations 507 to 511.

Figure 10:
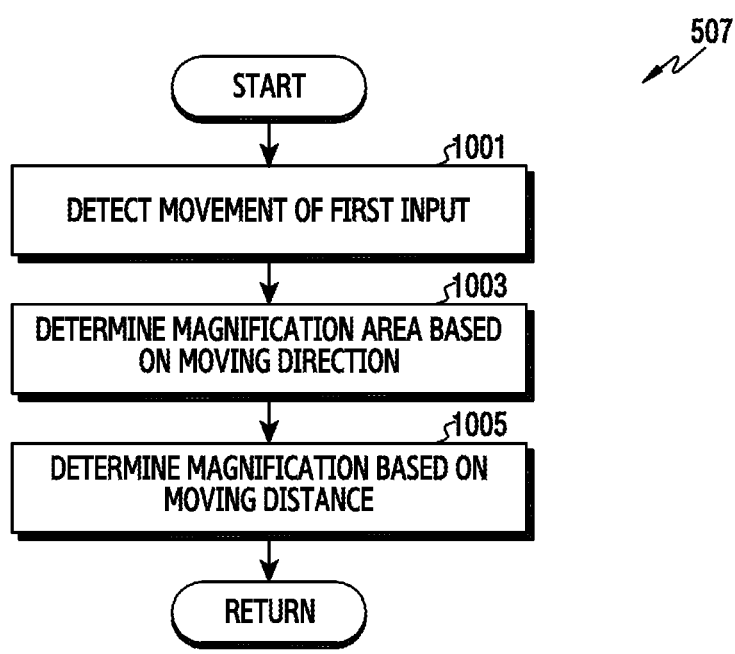
FIG. 10 is a flowchart illustrating an example operation of performing an operation of changing a configuration of a character input screen in the electronic device according to various example embodiments of the present disclosure.

FIG. 10 is a flowchart illustrating an example operation of performing an operation of changing a configuration of a character input screen in the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of changing the configuration of the character input screen may be a detailed operation of operation 507 of FIG. 5. Furthermore, FIG. 11 is a diagram illustrating an example operation of determining a magnification area in response to an input in the electronic device 400 according to various example embodiments.

According to various example embodiments of the present disclosure, as in operation 1001, the electronic device 400 may detect a movement of a first input. According to various example embodiments, the electronic device 400 may detect the movement of the first input in response to the first input satisfying the condition being detected.

According to various example embodiments of the present disclosure, as in operation 1003, the electronic device 400 may determine a magnification area based on the moving direction of the first input. According to an example embodiment, when the moving direction of the first input is an upward direction as illustrated in FIG. 11 (1100), the electronic device 400 may determine a magnification area so as to magnify at least part of the upper area of the character input screen as illustrated in FIG. 11 (1102). According to another example embodiment, when the moving direction of the first input is a rightward direction as illustrated in FIG. 11 (1110), the electronic device 400 may determine a magnification area so as to magnify at least part of the right area of the character input screen as illustrated in FIG. 11 (1112 or 1114).

According to various example embodiments of the present disclosure, as in operation 1005, the electronic device 400 may determine a magnification based on a moving distance. According to an example embodiment, when a moving distance of longer than a first threshold is identified, the electronic device 400 may magnify a magnification area based on or using a first magnification. According to another example embodiment, when a moving distance of longer than a second threshold is identified, the electronic device 400 may magnify the magnification area based on or using a second magnification.

According to various example embodiments, after determining the magnification area and the magnification based on the moving direction and the moving distance, the electronic device 400 may select a character corresponding to a second input. For example, the electronic device 400 may perform operations related to operations 509 to 511 of FIG. 5.

Figure 12:
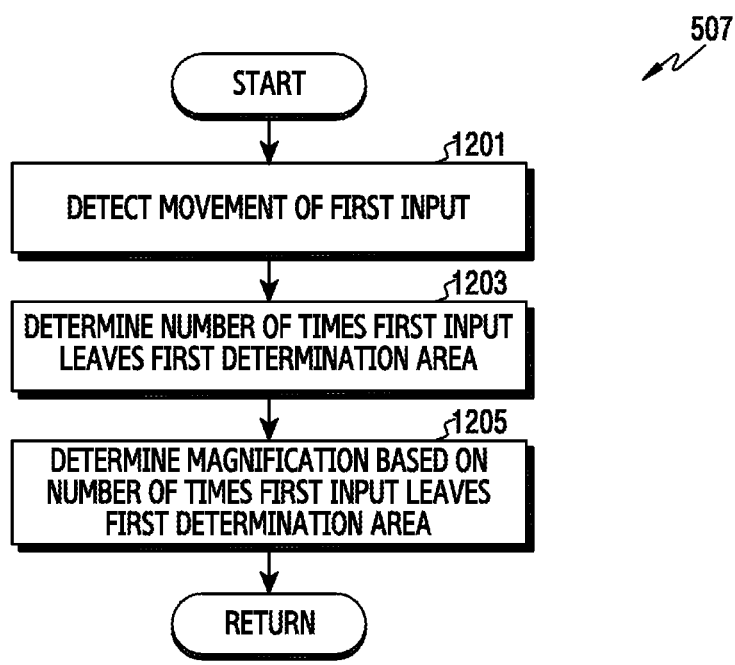
FIG. 12 is a flowchart illustrating an example operation of performing an operation of changing a configuration of a character input screen in the electronic device according to various example embodiments of the present disclosure.

FIG. 12 is a flowchart illustrating an example operation of performing an operation of changing a configuration of a character input screen in the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of changing the configuration of the character input screen may be a detailed operation of operation 507 of FIG. 5.

According to various example embodiments of the present disclosure, as in operation 1201, the electronic device 400 may detect a movement of a first input. According to various example embodiments, the electronic device 400 may detect the movement of the first input in response to the first input satisfying the condition being detected.

According to various example embodiments of the present disclosure, as in operation 1203, the electronic device 400 may determine the number of times the first input leaves or is outside the first determination area.

According to various example embodiments of the present disclosure, as in operation 1205, the electronic device 400 may determine a magnification based on the number of times the first input leaves the first determination area. According to an example embodiment, the electronic device 400 may magnify a magnification area based on a first magnification in response to the number of times of leaving being determined to be greater than or equal to a first threshold. According to another example embodiment, the electronic device 400 may magnify the magnification area based on a second magnification in response to the number of times of leaving being determined to be greater than or equal to a second threshold.

According to various example embodiments, the electronic device 400 may determine the magnification based on the number of times of leaving and then select a character corresponding to a second input. For example, the electronic device 400 may perform operations related to operations 509 to 511 of FIG. 5.

Figure 13:
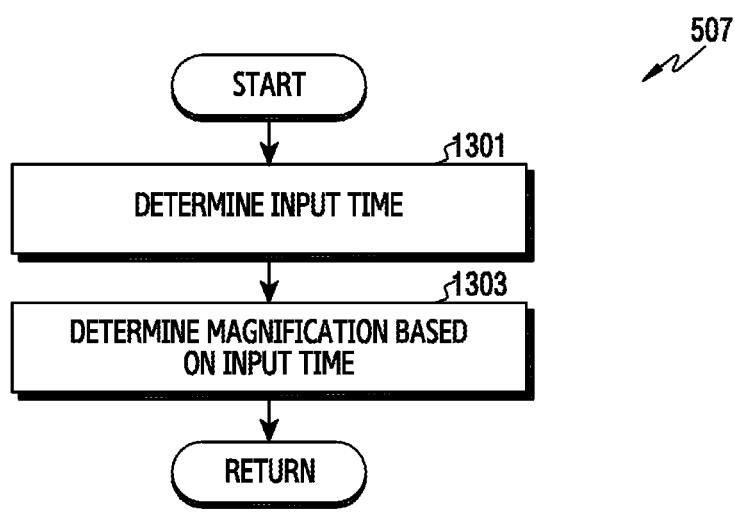
FIG. 13 is a flowchart illustrating an example operation of performing an operation of changing a configuration of a character input screen in the electronic device according to various example embodiments of the present disclosure.

FIG. 13 is a flowchart illustrating an example operation of performing an operation of changing a configuration of a character input screen in the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of changing the configuration of the character input screen may be a detailed operation of operation 507 of FIG. 5.

According to various example embodiments of the present disclosure, as in operation 1301, the electronic device 400 may determine an input time of a first input. According to various example embodiments, the electronic device 400 may detect a movement of the first input in response to the first input satisfying the condition being detected. According to an example embodiment, the electronic device 400 may determine the time of the first input which is held without moving within the first determination area.

According to various example embodiments of the present disclosure, as in operation 1303, the electronic device 400 may determine a magnification based on the input time. According to an example embodiment, the electronic device 400 may magnify a magnification area based on a first magnification in response to the input time being longer than a first threshold being determined. According to another example embodiment, the electronic device 400 may magnify the magnification area based on a second magnification in response to the input time being longer than a second threshold being determined.

According to various example embodiments, the electronic device 400 may determine the magnification based on the input time and then select a character corresponding to a second input. For example, the electronic device 400 may perform operations related to operations 509 to 511 of FIG. 5.

Figure 14:
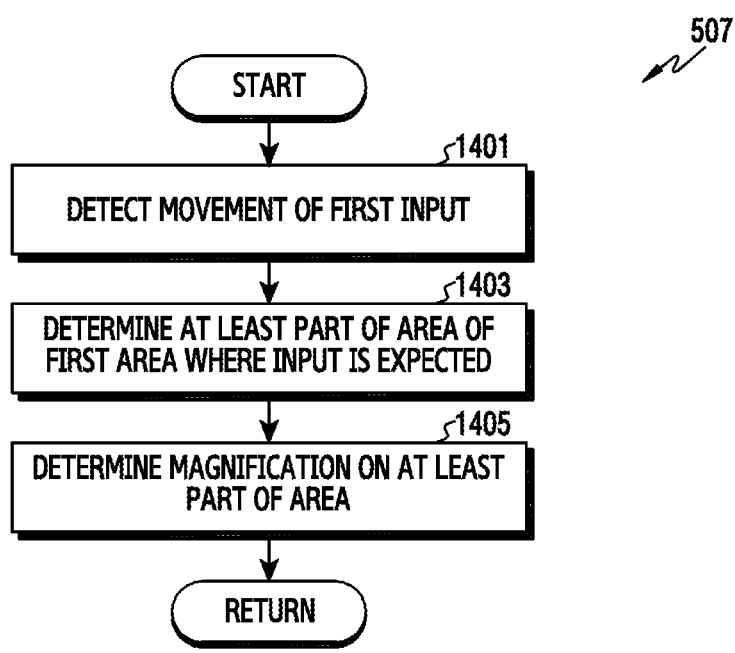
FIG. 14 is a flowchart illustrating an example operation of performing an operation of changing a configuration of a character input screen in the electronic device according to various example embodiments of the present disclosure.
Figure 15:
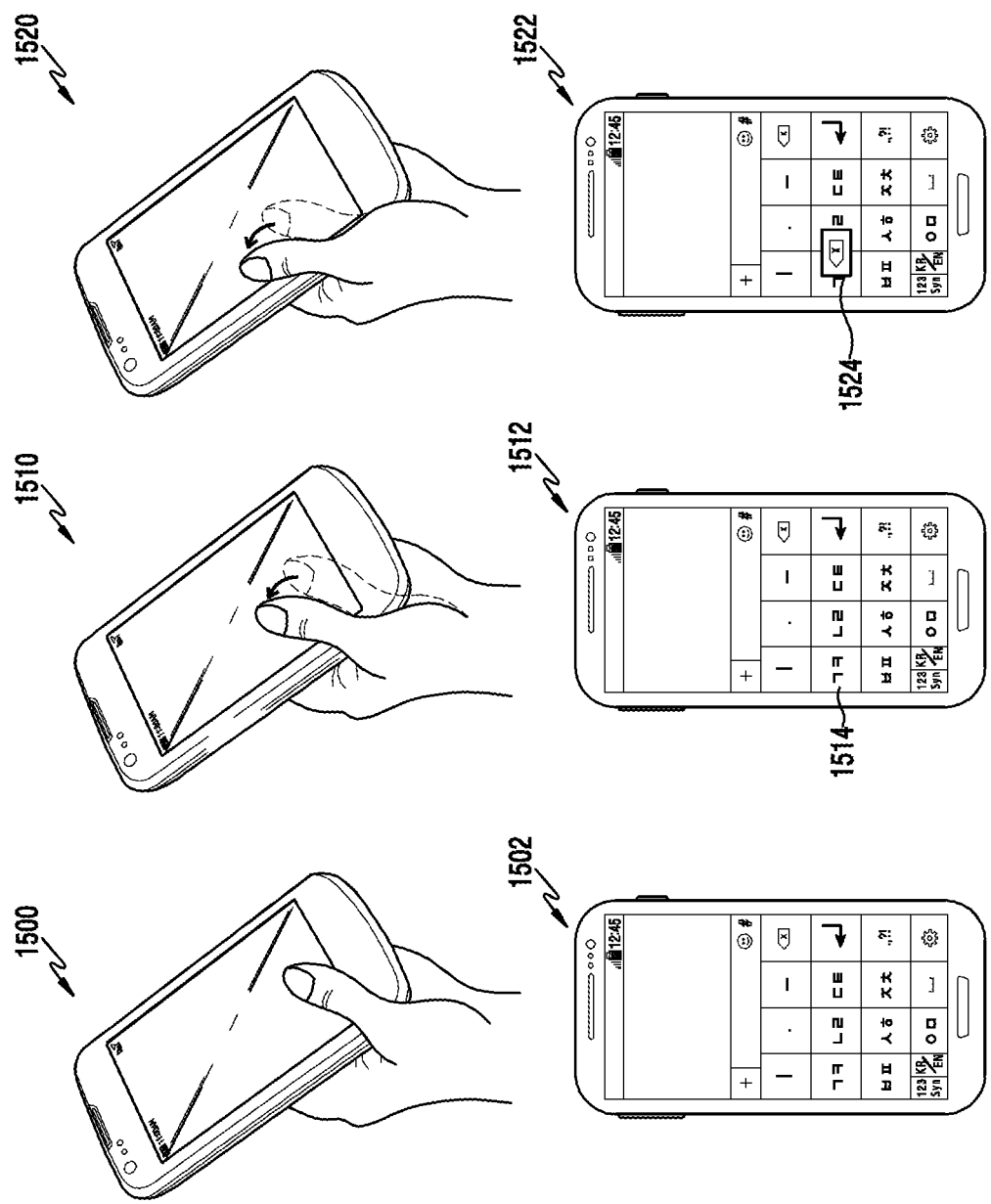
FIG. 15 is a diagram illustrating an example operation of outputting a part of the area of the screen which is expected to receive an input in response to an input in the electronic device according to various example embodiments.

FIG. 14 is a flowchart illustrating an example operation of performing an operation of changing a configuration of a character input screen in the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of changing the configuration of the character input screen may be a detailed operation of operation 507 of FIG. 5. Furthermore, FIG. 15 is a diagram illustrating an example operation of outputting a part of the area of the screen which is expected to receive an input in response to an input in the electronic device 400 according to various example embodiments.

According to various example embodiments of the present disclosure, as in operation 1401, the electronic device 400 may detect a movement of a first input. According to various example embodiments, the electronic device 400 may detect the movement of the first input in response to the first input satisfying the condition being detected.

According to various example embodiments of the present disclosure, as in operation 1403, the electronic device 400 may determine an area which is expected to receive an input as a magnification area. According to an example embodiment, the electronic device 400 may determine at least part of the area which is expected to receive a user's input in a first area of the screen corresponding to the moving direction of the input. For example, the electronic device 400 may determine an area where an input is detected more than a pre-designated number of times (for example, a key input area where an input is detected more than a designated number of times) or an area which is pre-defined by the user as a magnification area.

According to various example embodiments of the present disclosure, as in operation 1405, the electronic device 400 may determine a magnification on the at least part of the area. According to an example embodiment, the electronic device 400 may determine the magnification on the at least part of the area based on at least one of a moving distance of the first input, the number of times the first input leaves from the first determination area, and the input time of the first input, and may magnify the at least part of the area based on the determined magnification.

For example, with reference to FIG. 15, when the first input satisfies a first condition (for example, moves by longer than a first designated distance) (1500), the electronic device may output a normal character input screen 1502. According to another example embodiment, when the first input satisfies a second condition (for example, moves by longer than a second designated distance) (1510), the electronic device 400 may output a character input screen 1512 of which at least part, for example, the middle area of the screen 1514, is magnified. When a plurality of characters are arranged in a single keypad, the electronic device 400 may select a character according to a user's finger location within the magnified character input screen 1514.

According to another example embodiment, when the first input satisfies the second condition or a third condition (for example, moves by longer than a third designated distance) (1520), the electronic device 400 may output a character input screen 1522 in which at least part of the character input screen expected to receive an input, for example, a key input area 1524 designated to cancel an input character, is magnified.

According to various example embodiments, the electronic device 400 may magnify at least part of the area which is expected to receive an input and then select a character corresponding to a second input. For example, the electronic device 400 may perform operations related to operations 509 to 511 of FIG. 5.

Figure 16:
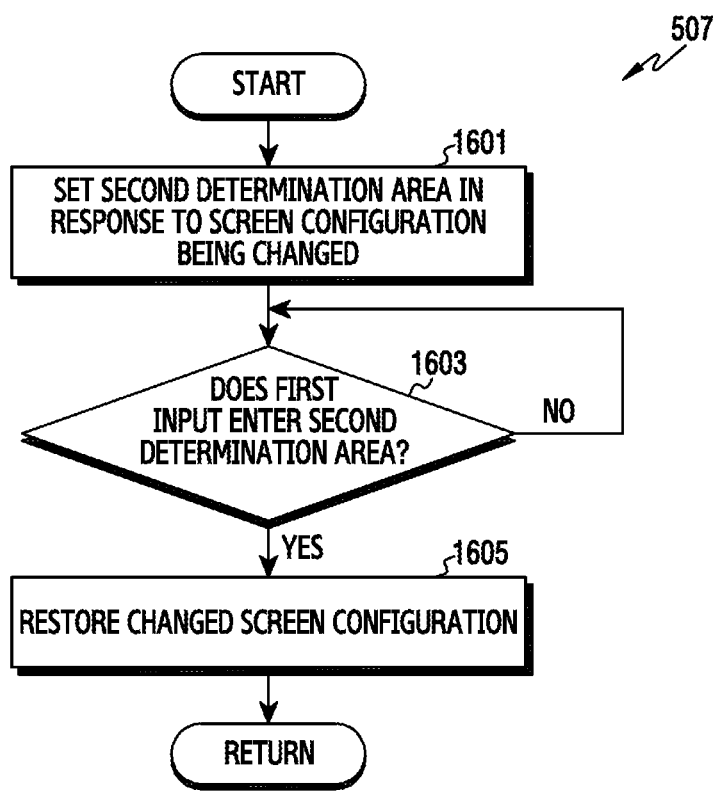
FIG. 16 is a flowchart illustrating an example operation of performing an operation of changing a screen configuration in the electronic device according to various example embodiments of the present disclosure.
Figure 17:
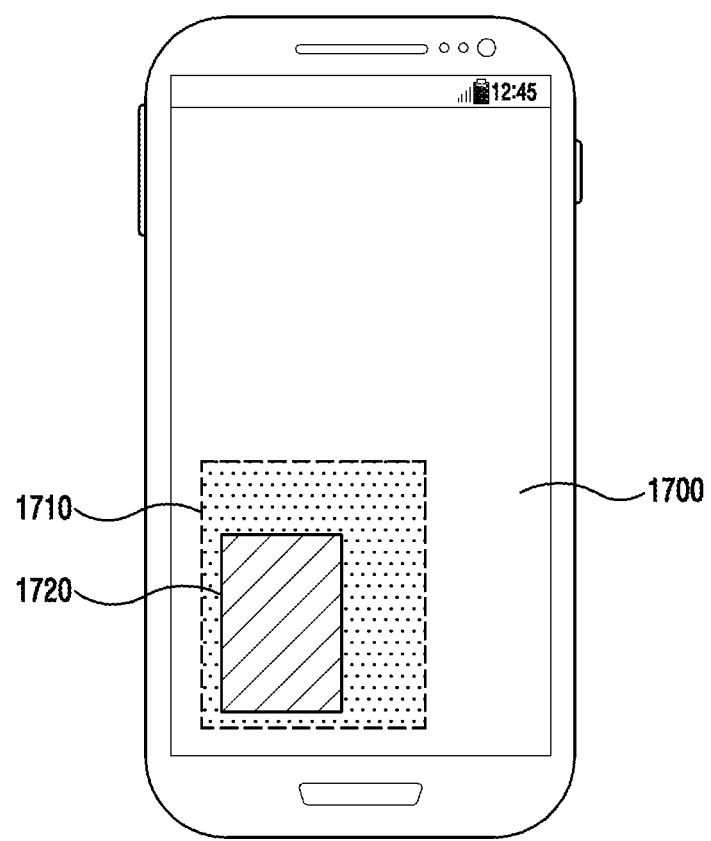
FIG. 17 is a diagram illustrating an example operation of setting a second determination area in the electronic device according to various example embodiments.
Figure 18:
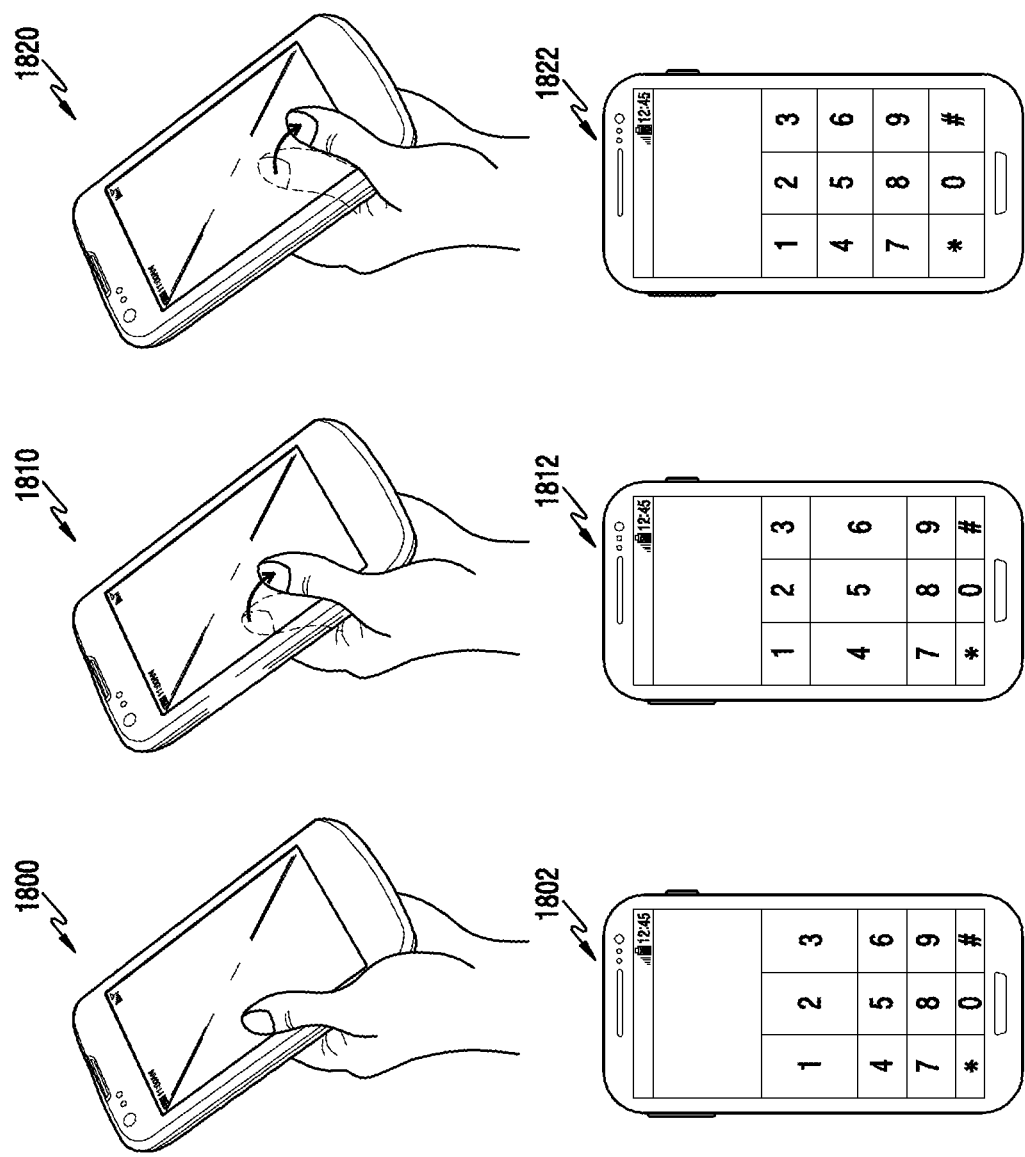
FIG. 18 is a diagram illustrating an example operation of restoring a changed screen in the electronic device according to various example embodiments.

FIG. 16 is a flowchart illustrating an example operation of performing an operation of changing a screen configuration of the electronic device 400 according to various example embodiments of the present disclosure. According to an example embodiment, the electronic device 400 may be the electronic device 101 or the electronic device 201 or a part thereof (for example, the processor 120 or the application processor 210). According to various example embodiments, the operation of changing the configuration of the character input screen may be a detailed operation of operation 507 of FIG. 5. Furthermore, FIG. 17 is a diagram illustrating an example operation of setting a second determination area in the electronic device 400 according to various example embodiments, and FIG. 18 is a diagram illustrating an example operation of restoring a changed screen in the electronic device 400 according to various example embodiments.

According to various example embodiments of the present disclosure, as in operation 1601, the electronic device 400 may set a second determination area in response to a screen configuration being changed. According to various example embodiments, the second determination area may be an area for detecting an input for restoring a changed screen configuration to a previous configuration. According to an example embodiment, the second determination area may be a part of the first determination area. For example, as illustrated in FIG. 17, the second determination area 1720 may have a smaller size than that of the first determination area 1710 displayed on the character input screen 1700 and may be displayed within the first determination area 1710.

According to various example embodiments of the present disclosure, as in operation 1603, the electronic device 400 may determine whether the first input enters the second determination area or not.

According to various example embodiments of the present disclosure, when the first input entering the second determination area is detected in operation 1603, the electronic device 400 may restore the changed screen configuration as in operation 1605. For example, the electronic device 400 may restore the screen configuration based on a moving distance to the second determination area. According to an example embodiment, as illustrated in FIG. 18, when a moving distance of longer than a first threshold is identified (1800), the electronic device 400 may restore the changed character input screen to a screen corresponding to the first threshold (1802). According to another example embodiment, when a moving distance of longer than a second threshold is identified (1810), the electronic device 400 may restore the changed character input screen to a screen corresponding to the second threshold (1812). According to another example embodiment, when a moving distance of longer than a third threshold is identified (1820), the electronic device 400 may restore the changed character input screen to a screen corresponding to the third threshold (1822).

Figure 19:
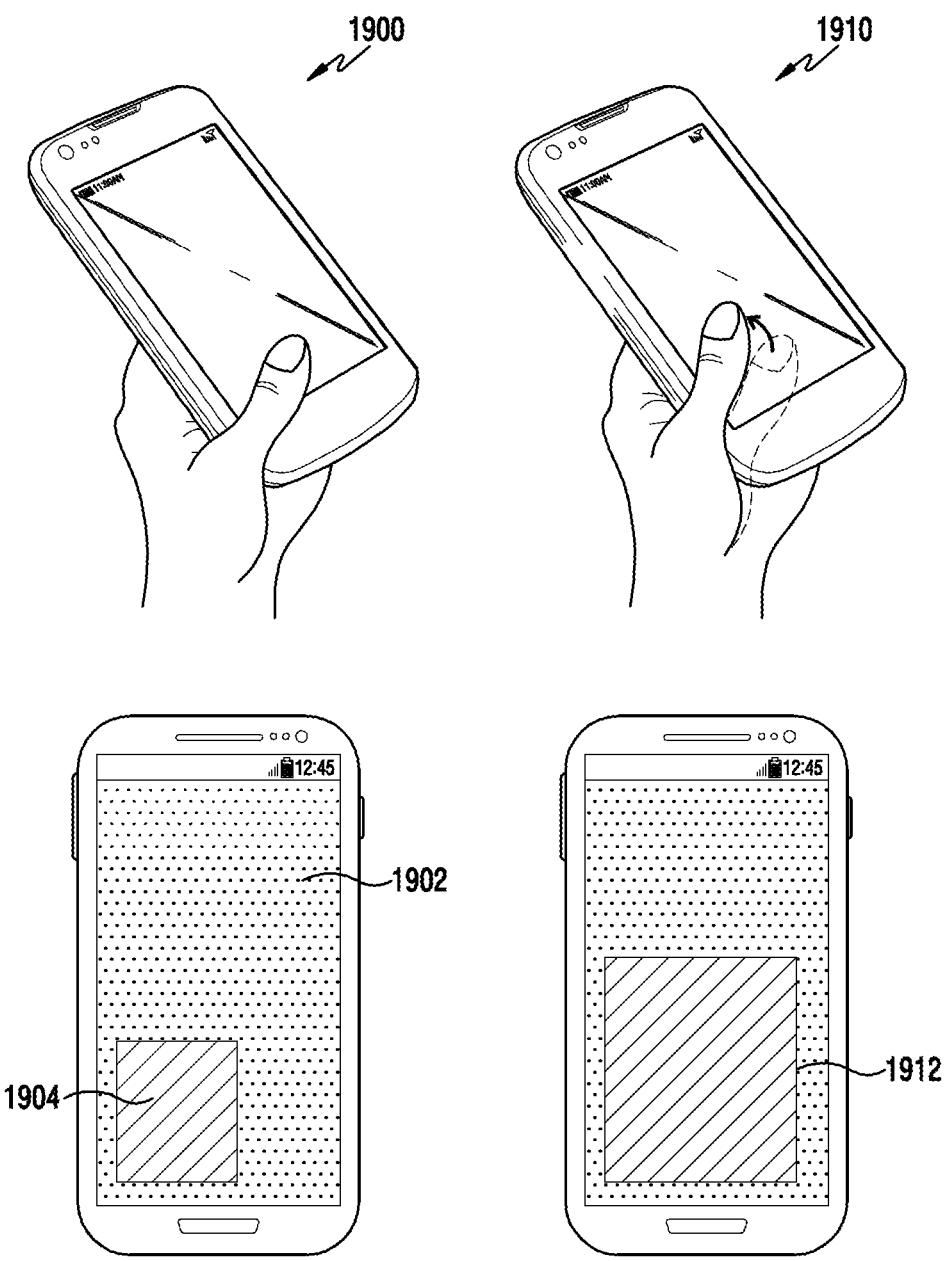
FIG. 19 is a diagram illustrating an example operation of performing a character input function in the electronic device according to various example embodiments.

FIG. 19 is a diagram illustrating an example operation of performing a character input function in the electronic device 400 according to various example embodiments. According to an example embodiment, the electronic device 400 may be a part of the electronic device 101 or the electronic device 201 (for example, the processor 120, the application processor 210, or the like).

According to various example embodiments, the electronic device 400 may change a configuration of a character input screen based on an input on a first determination area.

For example, the electronic device 400 may set a part of a character input screen 1902 as a first determination area 1904 based on the first input 1900 as illustrated in FIG. 19. According to various example embodiments, the first input may move and the electronic device 400 may re-set the first determination area 1912 in response to the moving input being detected (1910). According to an example embodiment, the electronic device 400 may magnify the first determination area 1904 of a first size to the second determination area 1912 of a second size in response to a moving distance. According to various example embodiments, when the configuration of the character input screen is changed, the electronic device 400 may reduce the first determination area and may magnify the area except for the first determination area. For example, as the size of the first determination areas increases, the reduced area may increase and the magnified area may increase.

According to various example embodiments, the electronic device 400 may determine a determination area based on a user's grip state. According to an example embodiment, the electronic device 400 may determine the location of the determination area based on a user's grip state, such that a user's intended character can be more precisely input. For example, the electronic device 400 may set the determination area with reference to the left lower end of the character input screen in response to a left hand grip state being detected, and may set the determination area with reference to the right lower end of the character input screen in response to a right hand grip state being detected.

Figure 20:
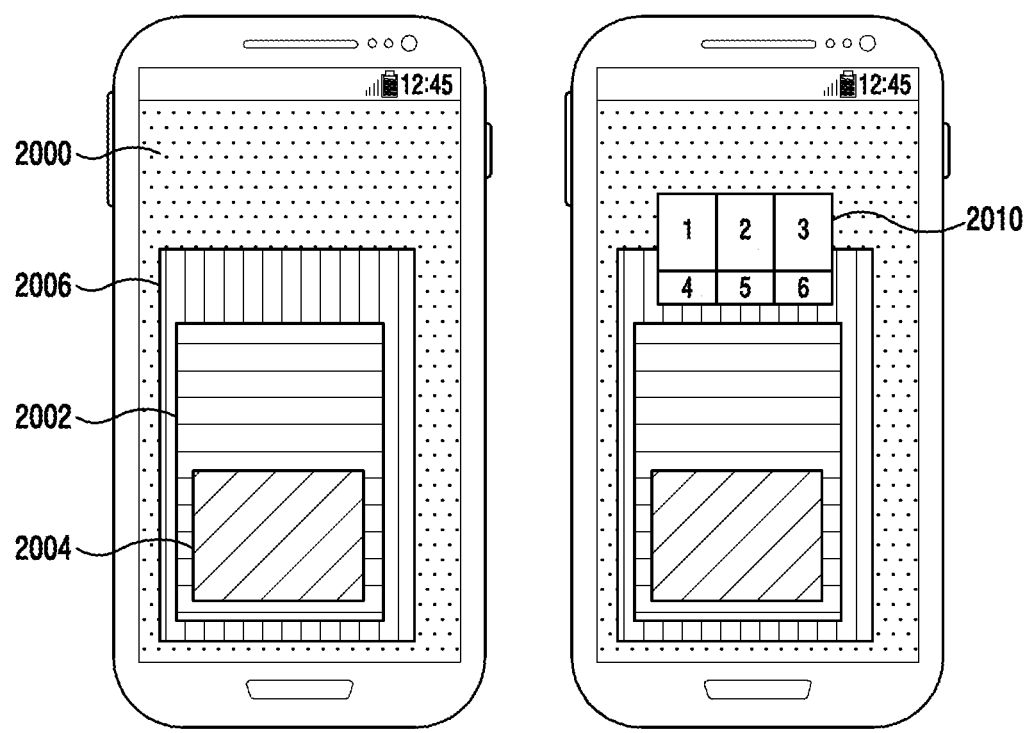
FIG. 20 is a diagram illustrating an example operation of performing a character input function in the electronic device according to various example embodiments.

FIG. 20 is a diagram illustrating an example operation of performing a character input function in the electronic device 400 according to various example embodiments. According to an example embodiment, the electronic device 400 may be a part of the electronic device 101 or the electronic device 201 (for example, the processor 120, the application processor 210, or the like).

According to various example embodiments, the electronic device 400 may divide a character input screen 2000 into a first determination area 2002, a second determination area 2004, and an input enabled area 2006 in order to change the configuration of the character input screen 2000. According to an example embodiment, the first determination area 2002 may be an area which is used to determine whether to change the screen configuration, and the second determination area 2004 may be an area for detecting an input for restoring the changed screen configuration to a previous configuration. The input enabled area 2006 may be defined as an area that the user can touch while gripping the electronic device 400. According to an example embodiment, the input enabled area 2006 and the second determination area 2004 may be distinguished from each other with reference to the first determination area 2002. For example, the input enabled area 2006 may be larger than the first determination area 2002 and the second determination area 2004 may be located within the first determination area 2002.

According to various example embodiments, the electronic device 400 may change the configuration of the character input screen 2000 by magnifying the outside area of the input enabled area 2006. For example, the electronic device 400 may magnify a character displayed on the outside of the input enabled area 2006. Furthermore, the electronic device 400 may display the magnified character at least on the input enabled area 2006 (2010).

Figure 21:
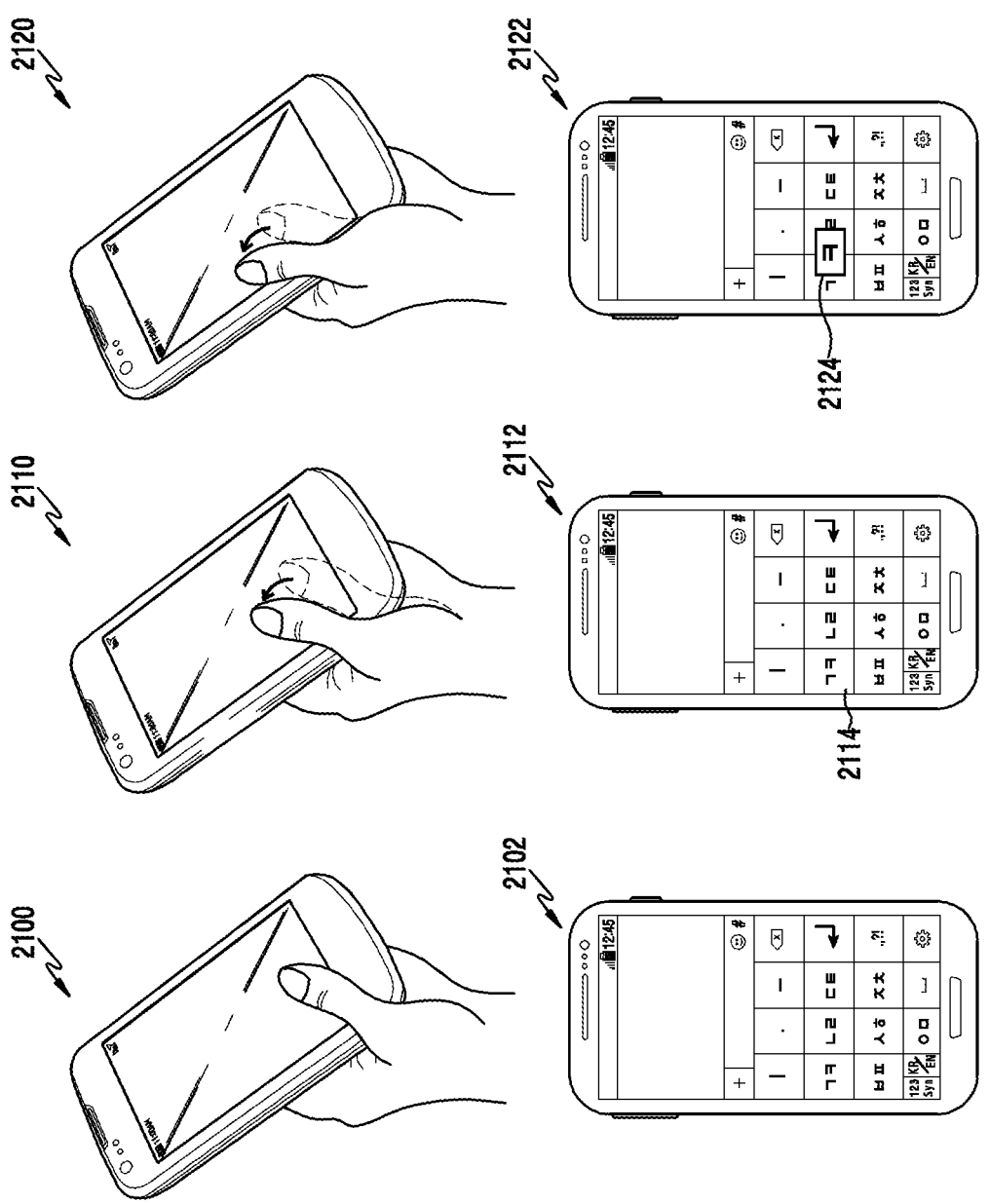
FIG. 21 is a diagram illustrating an example operation of changing a screen configuration in the electronic device according to various example embodiments of the present disclosure.

FIG. 21 is a diagram illustrating an example operation of changing a screen configuration in the electronic device 400 according to various example embodiments of the present disclosure.

According to an example embodiment, the electronic device 400 may be a part of the electronic device 101 or the electronic device 201 (for example, the processor 120, the application 210, or the like).

According to an example embodiment, as illustrated in FIG. 21, the electronic device 400 may output a character input screen including a plurality of key input areas which are arranged in a plurality of columns and in a plurality of rows (for example, a Korean alphabet key board in the form of a matrix including three columns and four rows). Furthermore, at least two characters may be selected through at least one key input area included in the character input screen. For example, with respect to a key input area in which a first character (for example, the Korean alphabet "ㄱ") and a second character (for example, the Korean alphabet "ㅋ") are set, the electronic device 400 may detect selection of the first character by detecting a single touch input, and detect selection of the second character by detecting two touch inputs.

According to various example embodiments, when a first input satisfies a first condition (for example, moves by longer than a first designated distance) (2100), the electronic device 400 may output a normal character input screen 2102. According to another example embodiment, when the first input satisfies a second condition (for example, moves by longer than a second designated distance) (2110), the electronic device 400 may output a character input screen 2112 of which at least part, for example, a middle area 2114 of the screen, is magnified. According to another example embodiment, when the first input satisfies the second condition or satisfies a third condition (for example, moves by longer than a third designated distance) (2120), the electronic device 400 may output a character input screen 2122 in which the first character or second character set in the currently magnified area is magnified (2124).

Figure 22:
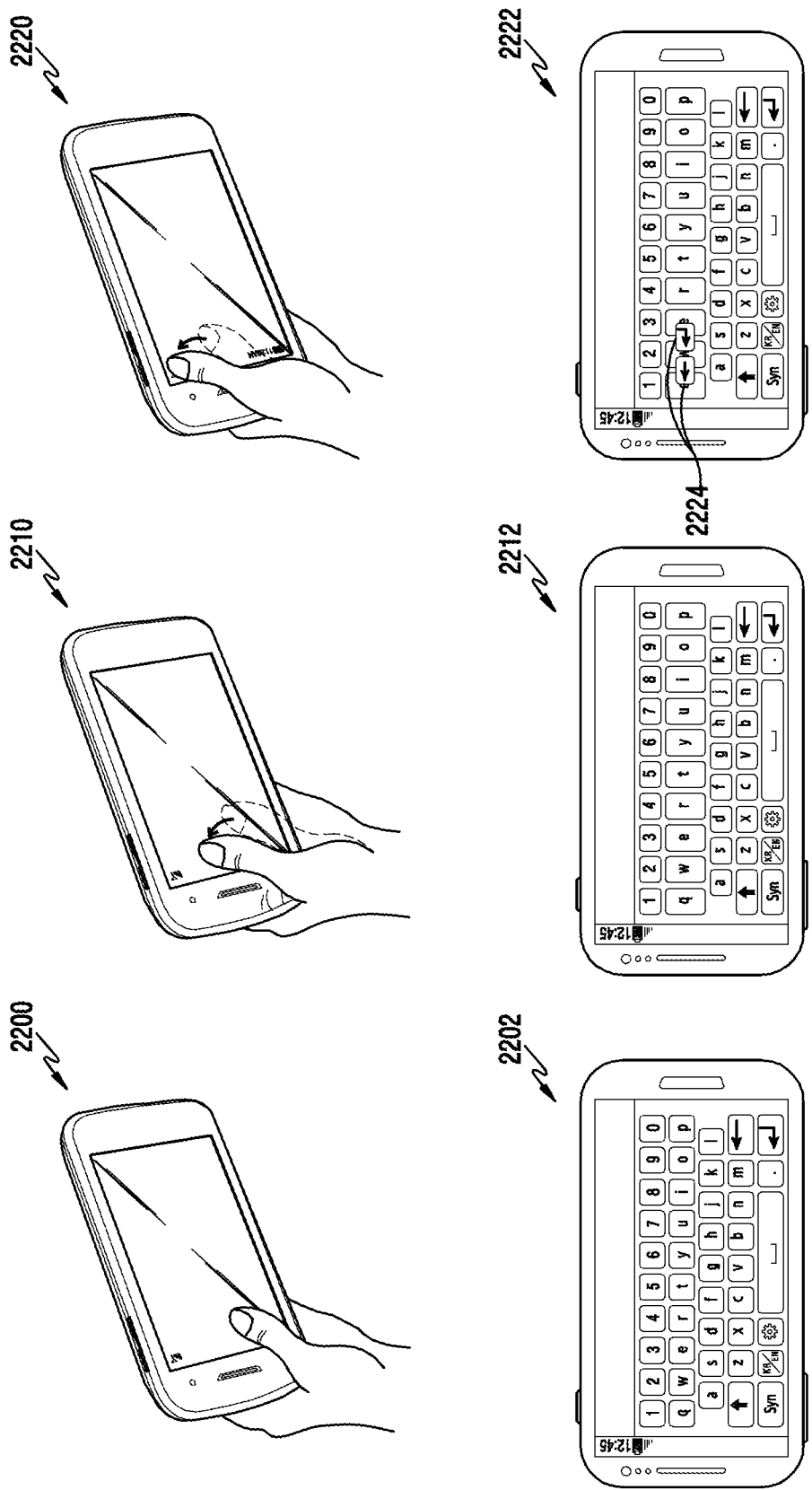
FIG. 22 is a diagram illustrating an example operation of changing a screen configuration in the electronic device according to various example embodiments of the present disclosure.

FIG. 22 is a diagram illustrating an example operation of changing a screen configuration in the electronic device 400 according to various example embodiments of the present disclosure.

According to an example embodiment, the electronic device 400 may be a part of the electronic device 101 or the electronic device 201 (for example, the processor 120, the application processor 210, or the like).

According to an example embodiment, as illustrated in FIG. 22, the electronic device 400 may output a character input screen (for example, an English keyboard (for example, a QWERTY keypad or the like) including a plurality of key input areas arranged in a plurality of columns and in a plurality of rows. Furthermore, the character input screen may be output in a landscape mode or a portrait mode in response to the electronic device 400 being rotated.

According to various example embodiments, when a first input satisfies a first condition (for example, moves by longer than a first predesignated distance) (2200), the electronic device 400 may output a normal character input screen 2202. According to another example embodiment, when the first input satisfies a second condition (for example, moves by longer than a second designated distance) (2210), the electronic device 400 may output a character input screen 2212 of which at least part, for example, a middle area of the screen, is magnified. According to another example embodiment, when the first input satisfies the second condition or a third condition (for example, moves by longer than a third designated distance) (2220), the electronic device 400 may magnify a key input area on which an input is detected more than a pre-designated number of times or a key input area 2224 which is pre-defined by the user, and output the magnified area (2222). The electronic device 400 may move a key input area which is frequently used by the user or designated by the user from among the key input areas located outside the input area into the input area.

According to various example embodiments, a method for operating of an electronic device may include: outputting a character input screen through a display; changing a configuration of the character input screen by magnifying at least part of a first area of the character input screen and reducing at least part of a second area of the character input screen based on a first input on the character input screen; and selecting a character based on a second input on the changed character input screen.

According to various example embodiments, the changing the configuration of the character input screen may include determining a magnification area of the character input screen and a magnification on the magnification area based on a moving direction and a moving distance of the first input on the character input screen.

According to various example embodiments, the changing the configuration of the character input screen may include detecting a movement of the first input leaving a first pre-designated area and changing the configuration of the character input screen.

According to various example embodiments, the changing the configuration of the character input screen may include setting the first pre-designated area based on a grip state.

According to various example embodiments, the changing the configuration of the character input screen may include displaying the magnified area on at least part of a second pre-designated area.

According to various example embodiments, the method may further include setting an area that is capable of receiving an input in a grip state as the second area.

According to various example embodiments, the changing the configuration of the character input screen may include restoring the changed character input screen based on the first input on the changed character input screen.

According to various example embodiments, the changing the configuration of the character input screen may include detecting a movement of the first input entering a third pre-designated area and restoring the configuration of the character input screen.

According to various example embodiments, the method may further include setting the third area within the first pre-designated area.

The electronic device for providing the character input function and the method for controlling thereof according to various example embodiments may magnify at least part of the character input screen and reduce at least part of the character input screen based on a contactless input, such that the user can more precisely input a character that the user intends to input.

The term "module" as used herein may, for example, mean a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a processor or processing circuitry (e.g., a CPU), an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various example embodiments of the present disclosure may be executed sequentially, in parallel, repeatedly, or in a heuristic manner. Further, some operations may be executed according to another order or may be omitted, or other operations may be added.

Various example embodiments disclosed herein are provided merely to aid in describing technical details of the present disclosure and to aid in the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
 a display; and
 at least one sensor;
 a processor configured to:
  output a character input screen comprising a plurality of characters through the display,
  set a pre-designated area, including a first pre-designated area and a second pre-designated area, corresponding to a first input based on the at least one sensor,
  in response to receiving the input on the display, determine a character group of the input screen corresponding to a moving direction of the first input relative to the pre-designated area,
  change a configuration of the character input screen based on the moving direction of the first input relative to the pre-designated area, by magnifying a first character comprised in the character group and reducing a second character comprised in the character group, and select a character based on a second input on the changed character input screen, wherein the configuration of the character input screen is changed before the select, wherein a size of each of the plurality of characters is changeable, wherein the first character of the character group comprises at least one character, from among the character group, which is arranged within a predetermined distance from an area where the first input is detected, and wherein the second character of the character group comprises remaining characters other than the first character of the character group.

2. The electronic device of claim 1, wherein the processor is configured to determine a magnification area of the character input screen and a magnification on the magnification area based on the moving direction and a moving distance of the first input on the character input screen.

3. The electronic device of claim 1, wherein the processor is configured to detect a movement of the first input leaving the first pre-designated area and to change the configuration of the character input screen.

4. The electronic device of claim 3, wherein the processor is configured to set the first pre-designated area based on a grip state.

5. The electronic device of claim 3, wherein the processor is configured to display at least part of the magnified area on at least part of a second pre-designated area.

6. The electronic device of claim 5, wherein the processor is configured to set an area that is capable of receiving an input in a grip state as the second area.

7. The electronic device of claim 1, wherein the processor is configured to restore the changed character input screen based on the first input on the changed character input screen.

8. The electronic device of claim 5, wherein the processor is configured to detect a movement of the first input entering a third pre-designated area and to restore the changed character input screen based on the first input on the changed character input screen.

9. The electronic device of claim 8, wherein the processor is configured to set the third area within the first pre-designated area.

10. The electronic device of claim 1, wherein the processor is configured to detect an input of a contactless type on the character input screen as the first input, and detect an input of a contact type on the character input screen as the second input.

11. A method for operating of an electronic device, the method comprising:

outputting a character input screen comprising a plurality of characters through a display;

setting a pre-designated area, including a first pre-designated area and a second pre-designated area, corresponding to a first input based on at least one sensor, in response to receiving the first input on the display, determining a character group of the input screen corresponding to a moving direction of the first input relative to the pre-designated area;

changing a configuration of the character input screen based on the moving direction of the first input relative to the pre-designated area by magnifying a first character comprised in the character group and reducing a second character comprised in the character group; and selecting a character based on a second input on the changed character input screen, wherein the configuration of the character input screen is changed before the selecting, wherein a size of each of the plurality of characters is changeable, wherein the first character of the character group comprises at least one character, from among the character group, which is arranged within a predetermined distance from an area where the first input is detected, and wherein the second character of the character group comprises remaining characters other than the first character of the character group.

12. The method of claim 11, wherein the changing the configuration of the character input screen comprises determining a magnification area of the character input screen and a magnification on the magnification area based on the moving direction and a moving distance of the first input on the character input screen.

13. The method of claim 11, wherein the changing the configuration of the character input screen comprises detecting a movement of the first input leaving the first pre-designated area and changing the configuration of the character input screen.

14. The method of claim 13, wherein the changing the configuration of the character input screen comprises setting the first pre-designated area based on a grip state.

15. The method of claim 13, wherein the changing the configuration of the character input screen comprises displaying at least part of the magnified area on at least part of the second pre-designated area.

16. The method of claim 15, further comprising setting an area that is capable of receiving an input in a grip state as the second area.

17. The method of claim 11, wherein the changing the configuration of the character input screen comprises restoring the changed character input screen based on the first input on the changed character input screen.

18. The method of claim 15, wherein the changing the configuration of the character input screen comprises detecting a movement of the first input entering a third pre-designated area and restoring the configuration of the character input screen.

19. The method of claim 18, further comprising setting the third area within the first pre-designated area.

20. A non-transitory computer readable recording medium which records a program, which, when executed, causes a processor to perform operations comprising:

outputting a character input screen comprising a plurality of characters through a display;

setting a pre-designated area, including a first pre-designated area and a second pre-designated area, corresponding to a first input based on at least one sensor, in response to receiving the first input on the display, determining a character group of the input screen corresponding to a moving direction of the first input relative to the pre-designated area;

changing a configuration of the character input screen based on the moving direction of the first input relative to the pre-designated area by magnifying a first character comprised in the character group and reducing a second character comprised in the character group; and selecting a character based on a second input on the changed character input screen, wherein the configuration of the character input screen is changed before the selecting, wherein a size of each of the plurality of characters is changeable, wherein the first character of the character group comprises at least one character, from among the character group, which is arranged within a predetermined distance from an area where the first input is detected, and wherein the second character of the character group comprises remaining characters other than the first character of the character group.

* * * * *